US008220607B2

(12) United States Patent
Watanabe et al.

(10) Patent No.: US 8,220,607 B2
(45) Date of Patent: Jul. 17, 2012

(54) TORQUE LIMITER-INCORPORATING ONE-WAY CLUTCH

(75) Inventors: Hajime Watanabe, Kashiwara (JP); Hideki Fujiwara, Nara (JP); Tomoya Yamatani, Toyota (JP); Masaki Maeda, Nisshin (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1052 days.

(21) Appl. No.: 11/905,064

(22) Filed: Sep. 27, 2007

(65) Prior Publication Data

US 2008/0078647 A1 Apr. 3, 2008

(30) Foreign Application Priority Data

| Sep. 28, 2006 | (JP) | 2006-263869 |
| Sep. 28, 2006 | (JP) | 2006-263875 |
| Sep. 28, 2006 | (JP) | 2006-263878 |
| Sep. 28, 2006 | (JP) | 2006-263882 |
| Dec. 27, 2006 | (JP) | 2006-353065 |

(51) Int. Cl.
*F16D 41/067* (2006.01)
*F16D 43/20* (2006.01)
*F16D 7/10* (2006.01)

(52) U.S. Cl. .............. 192/45.015; 192/56.5

(58) Field of Classification Search ........ 192/39, 192/55.1, 56.1, 56.6, 45.015
See application file for complete search history.

(56) References Cited

U.S. PATENT DOCUMENTS

| 3,954,161 A | 5/1976 | Ehret et al. |
| 5,669,476 A | 9/1997 | Lederman |
| 5,819,583 A * | 10/1998 | Matsushima et al. ........... 74/7 E |
| 6,830,137 B2 * | 12/2004 | Fujiwara ........................ 192/45 |

FOREIGN PATENT DOCUMENTS

| DE | 23 43 289 A1 | 3/1975 |
| FR | 2 566 493 A1 | 12/1985 |
| JP | 2002-106608 | 4/2002 |
| JP | 2002-106608 A | 4/2002 |
| JP | 2003-28201 | 1/2003 |
| JP | 2004-270877 A | 9/2004 |
| JP | 2005-114091 A | 4/2005 |
| JP | 2006-029437 A | 2/2006 |
| JP | 2006-234002 A | 9/2006 |

OTHER PUBLICATIONS

Japanese Office Actions Reference Nos. K20060715 and K20060776 dated May 24, 2011 with English translations thereof.
Japanese Office Action dated Jul. 5, 2011 with an English translation thereof.
European Search Rerport dated Jan. 31, 2011.

* cited by examiner

*Primary Examiner* — David D Le
*Assistant Examiner* — Ryan Dodd
(74) *Attorney, Agent, or Firm* — McGinn IP Law Group PLLC

(57) ABSTRACT

A length of each pocket of a cage in a circumferential direction is smaller than the sum of an outer diameter of a roller and a free length of a coil spring. The cage can rotate relative to an inner ring having cam surfaces in accordance with revolution of the rollers in an overload-applied condition, and the cage can not rotate in a direction opposite to a direction of revolution of the rollers in the overload-applied condition.

7 Claims, 15 Drawing Sheets

RELATED ART

TORQUE LIMITER-INCORPORATING ONE-WAY CLUTCH

BACKGROUND OF THE INVENTION

This invention relates to a one-way clutch, and more particularly to a torque limiter-incorporating one-way clutch in which when the clutch is subjected to an overload in a locked state, the locked state is canceled.

One-way clutch is provided, for example, in a pulley unit of an engine auxiliary equipment driven by a crank shaft of an automobile engine through a belt. Examples of such engine auxiliary equipments include a compressor for an air conditioner, an alternator, a water pump and a cooling fan.

For example, there are various compressors for an automobile air conditioner, and in any of these compressors, rotating power of a crank shaft of an automobile engine is used as a drive source. The transmission of power from the crank shaft to a rotation shaft of the compressor is effected through a belt.

The rotation of the crank shaft varies according to a combustion cycle of the engine, and therefore a variation in rotation is transmitted from the crank shaft to the rotation shaft of the compressor. When this rotation variation increases, a variation in tension of the belt increases, and there is a fear that this tension variation of the belt can not be absorbed, and slip may develop between contact portions of the pulley and belt, so that the belt may be worn or damaged.

A pulley unit 1 for a compressor of an automobile air conditioner which is shown in FIG. 1 is connected to a crank shaft of an automobile engine via a belt 4 so as to transmit power of the engine to a rotation shaft 3 of the compressor 2. This pulley unit 1 comprises a pulley 5 having the belt 4 extended therearound, a hollow shaft 6 disposed within an inner periphery of the pulley 5 and fixed to the rotation shaft 3 of the compressor 2, a double row rolling bearing 7 (comprising an inner ring 71, an outer ring 72, a plurality of balls 73 arranged in two rows, and a cage 74 holding these balls 73) disposed between the inner periphery of the pulley 5 and an outer periphery of the hollow shaft 6, a closed-bottom cylindrical hub (one way clutch outer ring-support member) 9 fixed to an end portion of the rotation shaft 3 by a cap nut 8, and one-way clutch 10 (comprising an inner ring 75 integral with the outer ring 72 of the rolling bearing 7, an outer ring 76, a plurality of rollers 77 disposed between the inner and outer rings 75 and 76, urging members (not shown) respectively urging the rollers 77 in a biting direction, and a cage 78 having pockets respectively holding the rollers 77) disposed between an outer periphery of the outer ring 72 of the rolling bearing 7 and an inner periphery of a cylindrical portion 9a of the hub 9.

The outer ring 76 of the one-way clutch 10 is integrally connected to the rotation shaft 3 through the hub 9, and the inner ring 75 of the one-way clutch 10 is integral with the pulley 5. The pulley 5 is driven to be rotated by the belt 4, and power is transmitted from the pulley 5 to the rotation shaft 3 of the compressor 2 through the one-way clutch 10. When the speed of rotation of the pulley 5 becomes higher than that of the rotation shaft 3 of the compressor 2, the one-way clutch 10 is rendered into a locked state, and rotates the pulley 5, the hub 9 and the rotation shaft 3 in unison, that is, in synchronism with one another. In contrast, when the speed of rotation of the pulley 5 becomes lower than that of the rotation shaft 3 of the compressor 2, the one-way clutch 10 is rendered into a free state, and interrupts the transmission of rotating power from the pulley 5 to the rotation shaft 3 of the compressor 2, so that the rotation shaft 3 continues to rotate only with a rotation inertia force.

An ordinary one-way clutch does not has the function of interrupting the transmission of power from a belt to a rotation shaft of a compressor when an overload acts on the one-way clutch. Therefore, when an overload is applied, there is encountered a problem that the belt slips relative to the pulley, so that the belt is subjected to seizure and damage. Therefore, in order to solve this problem, there is proposed in JP-A-2002-106608 Publication a torque limiter-incorporating one-way clutch in which a recess for receiving a roller therein is formed in that portion of each cam surface disposed beyond a locking position on this cam surface, and when an overload is applied, each roller is restrained in the recess in such a manner that the roller does not function as a biting member, and as a result an outer ring and an inner ring become free relative to each other, thereby interrupting the transmission of power, thus performing the function of the torque limiter.

In this torque limiter-incorporating one-way clutch, when the rotation of a rotation shaft becomes abnormal, for example, as a result of a failure of a compressor due to seizure, a loading torque of the one-way clutch increases, and when this loading torque reaches a predetermined value (for example, 60 Nm), each roller is moved beyond the locking position into a still narrower portion of a wedge-like space, and is fitted into the recess in the cam surface, so that each roller is disposed in a non-contact condition or idles relative to the pulley. As a result, the only the pulley rotates, and the transmission of the power from the pulley to the rotation shaft of the compressor is interrupted, thereby performing the function of the torque limiter.

In the torque limiter-incorporating one-way clutch of JP-A-2002-106608 Publication, when an overload is applied, the rollers are fitted respectively into the recesses, thereby canceling the locked state, and as a result the transmission of the power from the belt to the rotation shaft of the compressor is interrupted, and therefore the problem with respect to seizure and damage of the belt is solved. However, the following problem must be solved in order to secure a more positive power-interrupted condition. Namely, when the torque limiter is operated, a clearance develops between each roller and a corresponding spring (urging member) urging it, and the springs are not retained by any part, and therefore the springs become free, and this leads to a possibility that the springs are bitingly held between an outer ring and an inner ring. In this case, the one-way clutch can be returned to a normal condition in which power is again transmitted, and therefore it is necessary to prevent each spring from being bitingly held between the outer ring and the inner ring.

In the torque limiter-incorporating one-way clutch of JP-A-2002-106608 Publication, when an overload is applied, the rollers are fitted respectively into the recesses, thereby canceling the locked state, and as a result the transmission of the power from the belt to the rotation shaft of the compressor is interrupted, and therefore the problem with respect to seizure and damage of the belt is solved. However, the following problem must be solved in order to secure a more desirable torque limiter function. Namely, with respect to the positioning of the inner and outer rings of the torque limiter-incorporating one-way clutch, there are many deviations factors such as concentricity of the compressor shaft (rotation shaft) (to which a hub having the outer ring mounted thereon is fixed) with the inner ring serving also an outer ring of a bearing mounted on a compressor body, deviations developing during an assembling operation, etc., and there is a possibility that positioning precision is worsened, so that an operating torque for operating the torque limiter is much varied.

In the torque limiter-incorporating one-way clutch of JP-A-2002-106608 Publication, when an overload is applied, the rollers are fitted respectively into the recesses, thereby canceling the locked state, and as a result the transmission of the power from the belt to the rotation shaft of the compressor is interrupted, and therefore the problem with respect to seizure and damage of the belt is solved. However, the following problem must be solved in order to secure a more positive power-interrupted condition. Namely, when the rollers are to be fitted into the respective recesses, slip (engagement slip) occurs because of a reduced friction coefficient, and this leads to a possibility that the one-way clutch is damaged or broken by popping. Therefore, it is necessary to prevent such engagement slip.

In the torque limiter-incorporating one-way clutch of JP-A-2002-106608 Publication, when an overload is applied, the locked state is canceled, thereby interrupting the transmission of power from the belt to the rotation shaft of the compressor, and therefore the problem with respect to seizure and damage of the belt is solved. However, it is necessary to additionally form the recesses in the cam surfaces, and therefore it is required to increase the overall size or to reduce the number of the rollers if the size can not be increased, which has invited a problem that a torque capacity is decreased, JP-A-2003-028201 Publication discloses a roller-type one-way clutch in which lock cancellation recesss serving as a torque limiter function are formed in cam surfaces of the one-way clutch. In this torque limiter, when an overload develops, engagement rollers roll to be fitted into the respective lock cancellation recesss, thereby interrupting a torque.

FIGS. 15A and 15B are a side cross-sectional view and a front cross-sectional view of a conventional one-way clutch unit 200. This one-way clutch unit 200 includes a single-row one-way clutch 108 and a single-row support bearing 109 (in the form of a single-row ball bearing) which are disposed adjacent to each other in an axial direction. The one-way clutch unit 200 includes a one-piece outer ring 181, and a one-piece inner ring 172. The one-piece outer ring 181 includes a clutch outer ring portion 181a for the one-way clutch 108 and a bearing outer ring portion 181b for the support bearing 109 which are integral with each other. The one-piece inner ring 172 includes a clutch inner ring portion 172a for the one-way clutch 108 and a bearing inner ring portion 172b for the support bearing 109 which are integral with each other. The one-way clutch 108 includes engagement rollers 183 serving as wedge members. The clutch outer ring portion 181a of the one-piece outer ring 181 has a cylindrical inner peripheral surface, and the clutch inner ring portion 172a of the one-piece inner ring 172 has a cam surface 176 of an octagonal cross-section. Lock cancellation recesss 177 are formed in the cam surface 176. The one-way clutch 108 and the support bearing 109 are lubricated with the same grease sealed between the one-piece outer ring 181 and the one-piece inner ring 172, and seal members 111 and 112 are disposed between the one-piece outer ring 181 and the one-piece inner ring 172 at axial opposite end portions of the unit, and seal the grease. The one-way clutch 108 further includes a cage 182 holding the engagement rollers 183 in such a manner that the engagement rollers 183 are urged in one direction by urging springs (coil springs) 184, respectively. The cage 182 has pockets 182a in which the engagement rollers 183 are fitted, respectively. The support bearing 109 includes a crown type cage 117 holding balls (rolling elements) 116. In the one-way clutch 108, when an excessive torque develops, the engagement rollers 183 roll, and are fitted into the respective lock cancellation recesss 177, utilizing elastic deformation of the one-piece inner ring 172, one-piece outer ring 181 and engagement rollers 183, thereby interrupting the torque. Such a one-way clutch will hereinafter be referred to as "torque limiter-incorporating one-way clutch".

In the conventional torque limiter-incorporating one-way clutch, when an excessive torque develops, the engagement rollers rolls, and are fitted respectively into the respective lock cancellation recesss, utilizing elastic deformation of the one-piece inner ring, one-piece outer ring and engagement rollers, thereby interrupting the torque. However, variations in dimensions of the inner ring, outer ring, engagement rollers, etc., are large relative to the amount of elastic deformation (that is, dimensional accuracies are low), a variation (deviation) in the torque limiter-operating torque becomes large, and this invited a problem that the torque limiter function could not be performed just when this was desired.

It is an object of this invention to provide a one-way clutch in which the precision of a torque limiter operating-torque is enhanced so that a torque limiter function can be performed just when this is desired, and also to provide a one-way clutch unit having a support bearing formed integrally with a one-way clutch.

SUMMARY OF THE INVENTION

It is an object of this invention to provide a torque limiter-incorporating one-way clutch in which once the torque limiter is operated to interrupt power, this power interrupted condition can thereafter be positively maintained.

Another object of the invention is to provide a torque limiter-incorporating one-way clutch in which a variation (deviation) in value of a torque for operating the torque limiter is reduced.

A further object of the invention is to provide a torque limiter-incorporating one-way clutch in which engagement slip causing damage of the one-way clutch is prevented.

A still further object of the invention is to provide a torque limiter-incorporating one-way clutch in which a torque limiter function can be obtained from a one-way clutch with no torque limiter function without changing the size and the number of rollers, and a torque capacity can be increased as compared with a conventional torque limiter-incorporating one-way clutch.

According to one aspect of the present invention, there is provided a torque limiter-incorporating one-way clutch comprising an outer ring serving as a bearing ring, an inner ring serving as a bearing ring, a plurality of rollers disposed between the outer and inner rings, urging members respectively urging the rollers in a biting direction, and a cage having pockets respectively receiving the rollers, wherein cam surfaces each defining a locking position and a free position are formed on one of the two bearing rings respectively comprising the outer and inner rings, and a recess is formed in that portion of each cam surface disposed beyond the locking position such that when an overload is applied, each roller is fitted into the corresponding recess; characterized in that a length of each pocket of the cage in a circumferential direction is smaller than the sum of an outer diameter of the roller and a free length of the urging member, and the cage can rotate relative to the one bearing ring having the cam surfaces in accordance with revolution of the rollers in an overload-applied condition, and the cage can not rotate in a direction opposite to a direction of revolution of the rollers in the overload-applied condition.

The direction of revolution of the rollers in the overload-applied condition is the same as the direction of urging of the rollers by the urging members, and the expression "The cage can rotate in the direction of revolution of the rollers in the overload-applied condition, and can not rotate in the opposite direction" can be changed to an expression "The cage can not rotate in a direction of a reaction force of the urging members, and can rotate in the opposite direction". The cage is required to hold the urging members urging the respective rollers, and need to be prevented from being rotated by the reaction force of the urging members, but even if the cage is rotated in the opposite direction, this will not adversely affect the performance of the one-way clutch.

When an overload is applied, the rollers revolve toward the respective recesses, and at this time each roller is brought into abutting engagement with a roller receiving surface of the pocket of the cage. However, a torque acting on the rollers is large, and therefore the cage rotate together with the rollers. Then, when each roller is fitted into the recess, the rotation of the cage is stopped.

To achieve this construction in which the cage can rotate in accordance with the revolution of the rollers in the overload-applied condition, and can not rotate in the opposite direction, a peripheral surface (an outer peripheral surface in the case of an outer ring cam; an inner peripheral surface in the case of an inner ring cam) of the cage is so designed that a suitable clearance (play in the rotating direction) is formed between the bearing ring (having the cam surfaces) and the cage.

For example, in the case where the polygonal cam surface is formed on the inner ring, the inner peripheral surface of the cage is formed as a basic contour by a circumferential surface having a diameter equal to a maximum diameter of the polygonal cam surface, and rotation prevention portions are formed on the inner peripheral surface of the cage, and each rotation prevention portion extends along the cam surface from an angle portion of the *cam surface in the direction of revolution of the rollers in an overload-applied condition. Each rotation prevention portion extends from the angle portion of the cam surface in the direction of revolution of the rollers in an overload-applied condition, and therefore when the cage rotates in the direction of revolution of the rollers in the overload-applied condition, each rotation prevention portion will not engage the angle portion of the cam surface, and therefore the cage can rotate. When the cage tends to rotate in the direction opposite to the direction of revolution of the rollers in an overload-applied condition, each rotation prevention portion engages the angle portion of the cam surface, and therefore the cage can not rotate.

This one-way clutch is suitably used, for example, in a pulley unit (power transmission apparatus) comprising a pulley around which a belt is extended, a rotation shaft disposed within an inner periphery of the pulley, and a rolling bearing disposed between the inner periphery of the pulley and an outer periphery of the rotation shaft, and in this case the one-way clutch is disposed between an outer ring of the rolling bearing and an inner periphery of a cylindrical hub fixed to the rotation shaft. Such a pulley unit can be used in an auxiliary equipment, such as a compressor for an automobile air conditioner, and other various apparatuses.

The outer ring, the inner ring and the rollers of the one-way clutch are made of metal, and the cage is made of a synthetic resin. The urging member comprises a coil spring, but is not limited to such coil spring. The urging member is positioned and retained by an urging member retaining portion formed on the cage and having a projection or a recess. The urging member is held between the urging member retaining portion and the roller. The cam surfaces are formed on the inner ring, or formed on the outer ring.

In a normal condition, the rollers are received respectively in the pockets of the cage, and each roller is moved between the locking position and the free position in the circumferential direction, thereby performing the function of the one-way clutch. In an abnormal condition (overload-applied condition), each roller is fitted into the recess in the cam surface by an excessive torque, thereby canceling the locked state. At this time, the urging members move together with the cage in accordance with the movement of the rollers, and each urging member continues to be held between the roller and the urging member retaining portion of the cage, and therefore will not be dislodged out of position, and hence will be bitingly held between the inner ring and the outer ring.

In the case where a cage is not rotated, a pocket of the cage need to have a circumferential length equal to (a length of a compressed spring+a diameter of a roller+a size of a recess+ $\alpha$). On the other hand, in the above one-way clutch, the circumferential length of the pocket is smaller than the sum of the outer diameter of the roller and the free length of the urging member, and therefore the number of the rollers received in the cage can be increased, and the torque capacity can be increased.

In the torque limiter-incorporating one-way clutch, when an overload is applied, each roller is fitted into the recess by an excessive torque, thereby canceling the locked state (that is, operating the toque limiter), and at this time the cage rotates in the direction of revolution of the rollers, and therefore each urging member continues to be restrained by the roller and the cage, and is prevented from being dislodged out of position, and hence is prevented from being bitingly held between the inner ring and the outer ring. Therefore, once the torque limiter is operated to interrupt power, this power-interrupted condition is thereafter positively maintained.

According to another aspect of the invention, there is provided a torque limiter-incorporating one-way clutch comprising an outer ring serving as a bearing ring, an inner ring serving as a bearing ring, a plurality of rollers disposed between the outer and inner rings, urging members respectively urging the rollers in a biting direction, and a cage having pockets respectively receiving the rollers, wherein cam surfaces each defining a locking position and a free position are formed on one of the two bearing rings respectively comprising the outer and inner rings, and a lock cancellation recess is formed in that portion of each cam surface disposed beyond the locking position such that when an overload is applied, each roller is fitted into the corresponding lock cancellation recess; characterized in that centering recesses for respectively receiving the rollers in such a manner that each roller is fitted between the two bearing rings with no clearance are formed respectively in the cam surfaces, each centering recess being disposed between the locking position and the lock cancellation recess.

The centering recesses are the portions into which the rollers are fitted, respectively, only at the time of an assembling operation. At the time of assembling the one-way clutch, the rollers are held between the inner and outer rings with no clearance, that is, held in a locked condition. By doing so, the inner ring and the outer ring of the one-way clutch are aligned with each other. Thus, first, misalignment of the inner ring and outer ring is eliminated, and then an assembly comprising the one-way clutch and a hub (outer ring support member) is fixed to a body of an apparatus such for example as a compressor, and finally a rotation shaft and the hub are fastened together by a bolt in such a manner that the one-way clutch is centered. After the assembling operation, each roller is moved in a direction away from the lock cancellation recess from the exterior, and is located in a wedge-like space, in which condition the one-way clutch is used. A bolt passage hole in the hub has such a size that a certain clearance is formed between an inner peripheral edge of the bolt passage hole and a shank portion of the bolt, and a mounting position of the hub is finely adjusted in a radial direction. Here, the alignment or centering need to be effected by the rollers, and after the assembling operation, the rollers need to be moved respectively into the wedge-like spaces, and furthermore when the torque limiter is operated, each roller should not stop at the centering recess, but need to be moved beyond the centering recess into the lock cancellation recess. Therefore, to achieve these, there are several conditions for the dimensions. For example, the distance from the center of the one-way clutch to a bottom surface of the centering recess is at least larger than the distance from the center of the one-way clutch to a bottom surface of the lock cancellation recess (The centering recess is shallower than the lock cancellation recess).

In a normal condition, the rollers are received respectively in the pockets of the cage, and each roller is moved between the locking position and the free position in the circumferential direction, thereby performing the function of the one-way clutch. In an abnormal condition (overload-applied condition), each roller is moved beyond the centering recess into the lock cancelling recess by an excessive torque, thereby canceling the locked state.

The centering (aligning) can be effected utilizing the centering recesses, and therefore it is not necessary to provide a support bearing having inner and outer rings also serving respectively as the inner and outer rings of the one-way clutch, and a compact design can be achieved, and besides the cost can be reduced.

This one-way clutch is suitably used, for example, in a pulley unit (power transmission apparatus) comprising a pulley around which a belt is extended, a rotation shaft disposed within an inner periphery of the pulley, and a rolling bearing disposed between the inner periphery of the pulley and an outer periphery of the rotation shaft, and in this case the one-way clutch is disposed between an outer ring of the rolling bearing and an inner periphery of a cylindrical hub fixed to the rotation shaft. Such a pulley unit can be used in an auxiliary equipment, such as a compressor for an automobile air conditioner, and other various apparatuses.

The outer ring, the inner ring and the rollers of the one-way clutch are made of metal, and the cage is made of a synthetic resin. The urging member comprises a coil spring, but is not limited to such coil spring. The urging member is positioned and retained by an urging member retaining portion formed on the cage and having a projection or a recess. The urging member is held between the urging member retaining portion and the roller. The cam surfaces are formed on the inner ring, or formed on the outer ring.

In the torque limiter-incorporating one-way clutch of the invention, the rollers are retained in a locked condition in the respective centering recesses at the time of the assembling operation, and therefore the one-way clutch can be mounted on the apparatus (for example, a compressor body) with the inner and outer rings thereof aligned with each other. Therefore, a variation (deviation) in the torque for operating the torque limiter can be reduced. When an overload is applied, each roller is moved beyond the centering recess into the lock cancellation recess by an excessive torque, thereby canceling the locked state.

According to a further aspect of the invention, there is provided a torque limiter-incorporating one-way clutch comprising an outer ring serving as a bearing ring, an inner ring serving as a bearing ring, a plurality of rollers disposed between the outer and inner rings, urging members respectively urging the rollers in a biting direction, and a cage having pockets respectively receiving the rollers, wherein cam surfaces each defining a locking position and a free position are formed on one of the two bearing rings respectively of the outer and inner rings, and a lock cancellation recess is formed in that portion of each cam surface disposed beyond the locking position such that when an overload is applied, each roller is fitted into the corresponding lock cancellation recess; characterized in that a wedge angle at a region between the locking position and the lock cancellation recess is smaller than a wedge angle at the locking position.

The wedge angle means the angle formed by a tangential line of the inner ring and a tangential line of the outer ring. At the region between the locking position and the lock cancellation recess, the wedge angle may be constant or may vary in accordance with the revolution of the rollers. In either case, this wedge angle is kept smaller than the wedge angle at the locking position.

When the wedge angle increases, a normal force decreases, and a frictional force is reduced, which leads to a high possibility that slip (engagement slip) occurs. A condition (requirement) for preventing such engagement slip is $\tan(\theta/2) < \mu$ where $\mu$ represents a friction coefficient, and $\theta$ represents the wedge angle, and this condition has heretofore been secured at the locking position. The wedge angle at the region between the locking position and the lock cancellation position is set to a value smaller than the wedge angle at the locking position, and by doing so, engagement slip can be positively prevented at the time of operating the torque limiter.

In the case where the inner ring is an inner ring cam having a polygonal shape, and a lock cancellation recess is formed in that portion of the cam surface beyond a locking position, a wedge angle at a region between the locking position and the lock cancellation recess increases, which leads to a high possibility that engagement slip occurs. This can be prevented by decreasing the wedge angle, for example, by changing a cross-sectional shape of the vicinity of the lock cancellation recess from a straight line to a curved line. In this case, the cam surface is formed into an eccentric radius cam shape (Each cam surface is defined by an arc-shaped surface (when viewed in cross-section) disposed on a circle having its center eccentric from the center of the one-way clutch), and by doing so, the increase of the wedge angle can be lessened.

This one-way clutch is suitably used, for example, in a pulley unit (power transmission apparatus) comprising a pulley around which a belt is extended, a rotation shaft disposed within an inner periphery of the pulley, and a rolling bearing disposed between the inner periphery of the pulley and an outer periphery of the rotation shaft, and in this case the one-way clutch is disposed between an outer ring of the rolling bearing and an inner periphery of a cylindrical hub fixed to the rotation shaft. Such a pulley unit can be used in an auxiliary equipment, such as a compressor for an automobile air conditioner, and other various apparatuses.

The outer ring, the inner ring and the rollers of the one-way clutch are made of metal, and the cage is made of a synthetic resin. The urging member comprises a coil spring, but is not limited to such coil spring. The urging member is positioned and retained by an urging member retaining portion formed on the cage and having a projection or a recess. The urging member is held between the urging member retaining portion and the roller. The cam surfaces are formed on the inner ring, or formed on the outer ring.

In the torque limiter-incorporating one-way clutch of the invention, the wedge angle at the region (which is not used in the normal condition in which the one-way clutch is switched between the locked state and the free state) between the locking position and the lock cancellation recess is smaller than the wedge angle at the locking portion, and with this construction engagement slip causing damage of the one-way clutch can be prevented.

According to a further aspect of the invention, there is provided a torque limiter-incorporating one-way clutch comprising an outer ring serving as a bearing ring, an inner ring serving as a bearing ring, a plurality of rollers disposed between the outer and inner rings, urging members respectively urging the rollers in a biting direction, and a cage having pockets respectively receiving the rollers, wherein a cam surface of a polygonal shape defining locking positions and free positions is formed on one of the two bearing rings respectively comprising the outer and inner rings, and a locked state and a free state can be achieved in a normal condition, and besides a lock-canceled state can be achieved in an overload-applied condition; characterized in that the cage can be rotated relative to the cam surface by a torque in the overload-applied condition, and the cage includes normal-condition phase determining portions respectively comprising angle portions for fitting respectively to angle portions of the cam surface in the normal condition, and overload-condition phase determining portions respectively comprising angle portions for fitting respectively to the angle portions of the cam surface when the cage is rotated relative to the cam surface in the overload-applied condition, and the angle portions of the overload-condition phase determining portions are arranged such that when these angle portions are fitted respectively to the angle portions of the cam surface, the rollers are located at respective positions where the rollers are in a free condition.

The cam surface is formed, for example, into a regular polygonal shape, and as a result a plurality of wedge-like spaces are formed between the inner and outer rings. Each roller is bitingly held between the inner and outer rings at a narrower portion of the wedge-like space, and also is in a free condition at a wider portion of the wedge-like space. Namely, the cam surface has the portions where the rollers are free, and after the torque limiter is operated (that is, when the cage is rotated relative to the cam surface by an overloading torque, and the overload-condition phase determining portions are fitted on the cam surface, thereby stopping the cage), the rollers are retained at these positions. In order that the cage can easily rotate relative to the cam surface, the angle portions of the cam surface are preferably rounded (chamfered).

A circumferential length of each pocket of the cage is smaller than the sum of an outer diameter of the roller and a free length of the urging member, and the cage can be rotated relative to the bearing ring (having the cam surface) in accordance with revolution of the rollers in an overload-applied condition. In the normal condition, the angle portions of the normal-condition phase determining portions of the cage are fitted respectively to the angle portions of the cam surface, and each roller is received in the corresponding pocket of the cage, and is moved between the locking position and the free position in the circumferential direction, thereby performing the function of the one-way clutch. In an abnormal condition (overload-applied condition), each roller revolves beyond the locking position, and is brought into abutting engagement with a roller receiving surface of the cage, but a torque acting on the rollers is large, and therefore the cage is pushed by the rollers, and rotates together with the rollers. Then, when the angle portions of the overload-condition phase determining portions of the cage are fitted respectively to the angle portions of the cam surface, the rotation of the cage is stopped. At this time, the rollers need to be in a free condition in order to perform the torque limiter function, and the position of the angle portion of each overload-condition phase determining portion relative to the angle portion of the corresponding normal-condition phase determining portion is so determined that each roller is located at the wider portion of the wedge-like space.

In the case where the polygonal cam surface is formed on the inner ring, the inner peripheral surface of the cage has a shape formed by combining a polygonal inner peripheral surface corresponding to the cam surface (that is, corresponding to the normal-condition phase determining portions) with a polygonal inner peripheral surface (corresponding to the overload-condition phase determining portions) which is rotated (or angularly moved) a predetermined angle (slightly larger than a half of an internal angle of a polygon) relative to the first-mentioned polygonal inner peripheral surface (More specifically, the inner peripheral surface of the cage has the shape defined by a contour formed by the combined polygonal inner peripheral surfaces).

This one-way clutch is suitably used, for example, in a pulley unit (power transmission apparatus) comprising a pulley around which a belt is extended, a rotation shaft disposed within an inner periphery of the pulley, and a rolling bearing disposed between the inner periphery of the pulley and an outer periphery of the rotation shaft, and in this case the one-way clutch is disposed between an outer ring of the rolling bearing and an inner periphery of a cylindrical hub fixed to the rotation shaft. Such a pulley unit can be used in an auxiliary equipment, such as a compressor for an automobile air conditioner, and other various apparatuses.

The outer ring, the inner ring and the rollers of the one-way clutch are made of metal, and the cage is made of a synthetic resin. The urging member comprises a coil spring, but is not limited to such coil spring. The urging member is positioned and retained by an urging member retaining portion formed on the cage and having a projection or a recess. The urging member is held between the urging member retaining portion and the roller. The cam surfaces are formed on the inner ring, or formed on the outer ring.

In a conventional torque limiter-incorporating one-way clutch, a pocket of a cage need to have a circumferential length equal to (a length of a compressed spring+a diameter of a roller+a size of a recess+α), and this conventional one-way clutch is larger in size as compared with a one-way clutch without a torque limiter function. On the other hand, in the one-way clutch of the invention, the circumferential length of the pocket is smaller than the sum of the outer diameter of the roller and the free length of the urging member, and therefore the number of the rollers received in the cage can be increased, and the torque capacity can be increased.

In the torque limiter-incorporating one-way clutch, when an overload is applied, the cage is pushed by the rollers, and rotates together with the rollers, and when the angle portions of the overload-condition phase determining portions are fitted respectively to the angle portions of the cam surface, the rotation of the cage is stopped, and also the rollers become free, and therefore the torque limiter function can be obtained. This torque limiter function can be obtained merely by changing the shape of a cage of a one-way clutch without a torque limiter function, and therefore the torque capacity can be increased as compared with a conventional torque limiter-incorporating one-way clutch.

According to a further aspect of the invention, there is provided a torque limiter-incorporating one-way clutch including an inner ring, an outer ring, engagement rollers, cam surfaces, and lock cancellation recesss; characterized in that at a region where each engagement roller shifts to the lock cancellation recess, a thickness of the outer ring is smaller than a thickness of the inner ring when viewed in cross-section. In the one-way clutch of the invention, at the region where each engagement roller shifts to the lock cancellation recess, the thickness of the outer ring is smaller than the thickness of the inner ring when viewed in cross-section, and therefore when the engagement roll is to be fitted into the lock cancellation recess, the outer ring is mainly elastically deformed, and by controlling the thickness of the outer ring, the precision of a torque limiter-operating torque can be enhanced. Therefore, the torque limiter function can be performed just when this is desired, and damage of an engine auxiliary equipment due to an excessive torque can be prevented.

In the one-way clutch of the invention, the thickness of the outer ring is preferably not more than 90% of the thickness of the inner ring, and more preferably not more than 70%. In the one-way clutch, thus, the thickness of the outer ring is preferably not more than 90% of the thickness of the inner ring, and more preferably not more than 70%, and therefore the outer ring can be elastically deformed more easily than the inner ring, and by controlling the thickness of the outer ring, the precision of the torque limiter-operating torque can be easily enhanced.

According to a further aspect of the invention, there is provided a one-way clutch unit including an inner ring, an outer ring, engagement rollers, cam surfaces, and lock cancellation recesss; characterized in that a support bearing is integral with the one-way clutch, and a low-rigidity portion is formed at at least one of the inner ring and the outer ring at a boundary between the support bearing and the one-way clutch. A one-way clutch unit is required to have a support bearing for positioning (aligning) inner and outer rings, and without the support bearing, a wedge angle of the one-way clutch is changed, and a torque limiter-operating torque in the one-way clutch is varied. Therefore, there are conventional one-way clutch units in which a support bearing is integral with a one-way clutch. However, in such a one-way clutch unit, the rigidity of the one-way clutch is influenced by the rigidity of the support bearing, and in order that adverse effects of the rigidity of the support bearing will not be exerted on the one-way clutch, the support bearing need to be mounted sufficiently apart from the one-way clutch. Alternatively, a low-rigidity portion is provided in order that adverse effects of the rigidity of the support bearing will not be exerted on the one-way clutch. In the one-way clutch unit of the invention, the low-rigidity portion is formed at at least one of the inner ring and the outer ring at the boundary between the support bearing and the one-way clutch, and therefore adverse effects of the rigidity of the support bearing on the one-way clutch are eliminated. However, even the low-rigidity portion must have necessary strength and rigidity for the transmission of a torque.

In the one-way clutch unit of the invention, preferably, the low-rigidity portion is provided at the outer ring. Generally, in a torque limiter-incorporating one-way clutch, a cam surface is formed on an outer peripheral surface of an inner ring, while a circumferential surface of a round cross-section is formed on an inner peripheral surface of the outer ring. The precision of a thickness can be more easily controlled at the circumferential surface as compared with the cam surface, and it is preferred to provide the low-rigidity portion at the outer ring having the inner peripheral surface defined by the round circumferential surface. In this one-way clutch unit, the low-rigidity portion is provided at the outer ring, and therefore adverse effects of the support bearing on the thickness of the outer ring for controlling the precision of the torque limiter-operating torque can be eliminated.

Furthermore, in the one-way clutch unit of the invention, the low-rigidity portion is preferably a reduced thickness portion. In this one-way clutch unit, thus, the low-rigidity portion is defined by the reduced thickness portion, and therefore the necessary torque transmission can be effected, and also when an overload is applied, adverse effects of the support bearing can be easily shut off. Incidentally, the low-rigidity portion may be in any other suitable form than the reduced thickness portion, such as a groove, a continuous hole, a low-rigidity welded portion, etc.

In the one-way clutch unit of the invention, the low-rigidity portion is preferably a notch for inducing bending deformation in a radially outward direction. In the one-way clutch unit, the low-rigidity portion is defined by the notch for inducing the bending deformation in the radially outward direction, and therefore the necessary torque transmission can be effected, and also when an overload is applied, adverse effects of the support bearing can be easily shut off.

In the one-way clutch unit, preferably, at the above-mentioned region, the thickness of the outer ring of the one-way clutch is smaller than a thickness of an outer ring of the support bearing when viewed in cross-section. In the one-way clutch unit of the invention, the thickness of the outer ring of the one-way clutch is smaller than the thickness of the outer ring of the support bearing, and therefore the support bearing has sufficient rigidity to position (align) the inner ring and the outer ring, and also the precision of the torque limiter-operating torque can be enhanced according to the thickness of the outer ring of the one-way clutch.

BRIEF DESCRIPTION OF THE DRAWINGS

FIG. 3A shows the normal condition, FIG. 3B shows a condition between the normal condition and the torque limiter operated condition, and FIG. 3C shows the torque limiter operated condition.

DETAILED DESCRIPTION OF THE PREFERRED EMBODIMENTS

Preferred embodiments of the present invention will now be described with reference to the drawings.

First Embodiment

Figure 2:
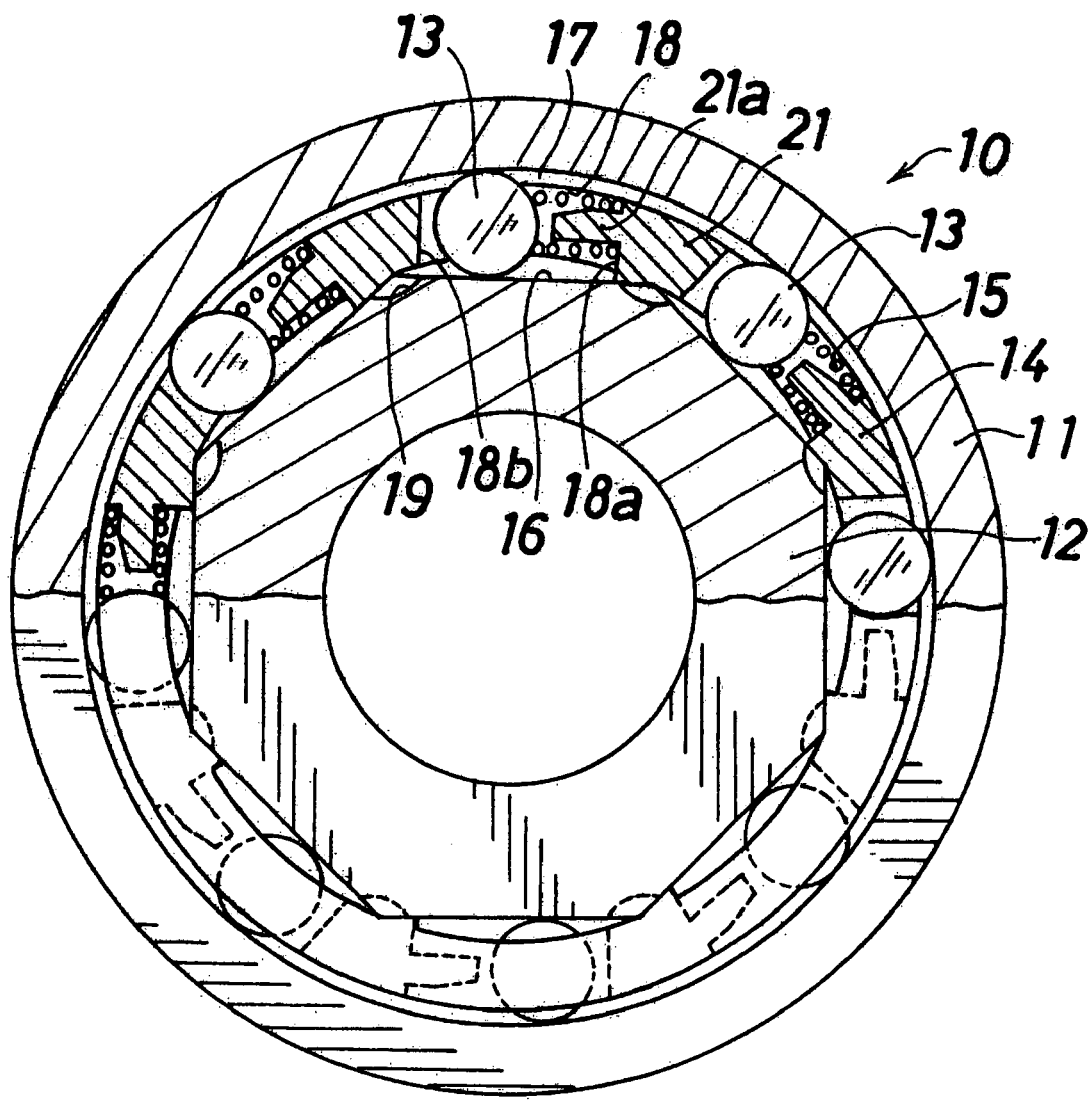
FIG. 2 is a transverse cross-sectional view of a first embodiment of a one-way clutch of the invention.

FIGS. 2 and 3 show one preferred embodiment of a torque limiter-incorporating one-way clutch of the present invention.

Figure 1:
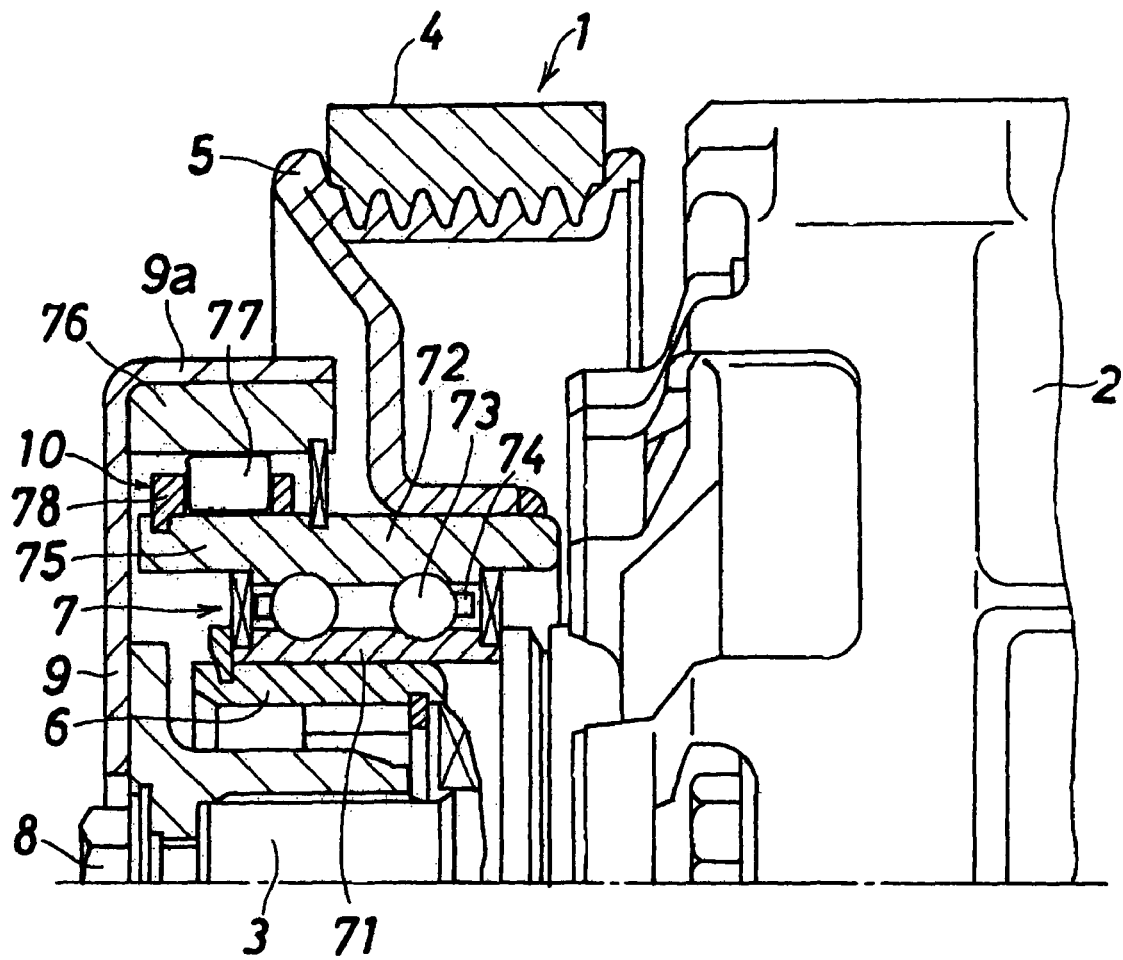
FIG. 1 is a cross-sectional view showing one example of a pulley unit for a compressor in which a one-way clutch of the present invention is used.

This one-way clutch 10 is used as the one-way clutch 10 shown in FIG. 1, and comprises a cylindrical outer ring 11, an inner ring 12 having an outer peripheral surface of a polygonal shape having cam surfaces 16 each defining a locking position and a free position, a plurality of rollers 13 (serving as biting members) which are disposed respectively in wedge-like spaces 17 each formed between the corresponding cam surface 16 and an inner peripheral surface of the outer ring 11, and are bitingly held between the outer ring 11 and the inner ring 12 upon rotation of the outer and inner rings 11 and 12 relative to each other in one direction (locking direction), and are brought out of biting engagement with the outer and inner rings 11 and 12 upon relative rotation in the other direction (free direction), coil springs (urging members) 15 respectively urging the rollers 13 in the biting direction (toward narrower portions of the respective wedge-like spaces 17), and an annular cage 14 having pockets 18 receiving the respective rollers 13 and coil springs 15 and holding the rollers 13 respectively in the wedge-like spaces 17.

The cam surfaces 16 are formed by the outer peripheral surface of the inner ring 12 which has a polygonal (octagonal in the illustrated embodiment) transverse cross-section. The wedge-like space 17 is formed between a counterclockwise portion of each of eight surfaces (eight sides in a cross-sectional view) of the polygon and the inner peripheral surface of the outer ring 11.

Each pocket 18 of the cage 14 has a spring receiving surface 18a receiving a proximal end of the coil spring 15 having a distal end abutting against the roller 13, and also has a roller receiving surface 18b which is disposed in slightly spaced, opposed relation the roller 13 located in the locking position. The roller 13, when rolled beyond the locking position, is brought into abutting engagement with the roller receiving surface 18b.

A length (the distance from the spring receiving surface 18a to the roller receiving surface 18b in the circumferential direction) of each pocket 18 of the cage 14 in the circumferential direction is smaller than the sum of an outer diameter of the roller 13 and a free length of the coil spring 15. With this construction, each roller 13 and the corresponding coil spring 15 are always held in contact with each other regardless of the position of the roller 13. An axial dimension of the pocket 18 of the cage 14 is larger than an axial dimension of the roller 13, and therefore the roller 13, while guided by the pocket 18, can move between the locking position and the free position.

A projection 21a is formed on the spring receiving surface 18a of the cage 14, and guides the coil spring 15. The spring receiving portion 18a and the projection 21 a jointly form a spring retaining portion (urging member retaining portion) 21. The coil spring 15 is not engaged with the projection 21a, and is held between the spring receiving surface 18a and the roller 13. Therefore, when the roller 13 is disengaged from the coil spring 15, there is a possibility that the coil spring 15 is disengaged from the projection 21a.

Recesses 19 are formed respectively in those portions of the cam surfaces 16 disposed respectively beyond the locking positions, and when an overload is applied, the rollers 13 are fitted into the respective recesses 19. As described later, the cage 14 can rotate counterclockwise (FIG. 2) in accordance with revolution of the rollers 13 in an overload-applied condition, and can not rotate in a direction (clockwise direction in FIG. 2) opposite to the direction of revolution of the rollers 13 in the overload-applied condition.

In this one-way clutch 10, when the speed of rotation of the outer ring 11 becomes higher than that of the inner ring 12, each roller 13 rolls (in the counterclockwise direction in the drawings) into the narrower portion of the wedge-like space 17, thereby achieving the locked state, and as a result the outer ring 11 and the inner ring 12 are connected together in a unitary manner, and therefore rotate in synchronism with each other. However, when the speed of rotation of the outer ring 11 becomes lower than that of the inner ring 12, each roller 13 rolls (in the clockwise direction in the drawings) into a wider portion of the wedge-like space 17, thereby achieving the free state, and as a result the transmission of rotating power from the outer ring 11 to the inner ring 12 is interrupted, so that the inner ring 12 continues to rotate only with a rotation inertia force.

As shown in detail in FIG. 3, an inner peripheral surface of the cage 14 is not formed in conformity with the cam surfaces 16 of the inner ring 12, but is formed as a basic contour by a circumferential surface 14a (having a diameter equal to a maximum diameter (a length of a diagonal) of the polygonal cam surface (the cam surfaces 16). Rotation prevention portions 22 are formed on the inner peripheral surface of the cage 14, and each rotation prevention portion 22 extends along the cam surface 16 from an angle portion 16a of the cam surface 16 in the direction of revolution of the rollers 13 in the overload-applied condition. In other words, an inner peripheral surface of a conventional cage is formed into a polygonal shape so as to prevent the rotation of the cage relative to the inner ring (12) having the cam surfaces (16). On the other hand, in order that the cage 14 can rotate only in the direction of revolution of the rollers 13 in the overload-applied condition, an arc-shaped inner peripheral surface 14a having a diameter equal to the maximum diameter of the polygonal cam surface (cam surfaces 16) is formed except the vicinity of each spring receiving surface 18a forming the spring retaining portion 21, and with this arrangement the rotation prevention portion 22 is formed at the radially inward side of the spring retaining portion 21.

Figure 3A:
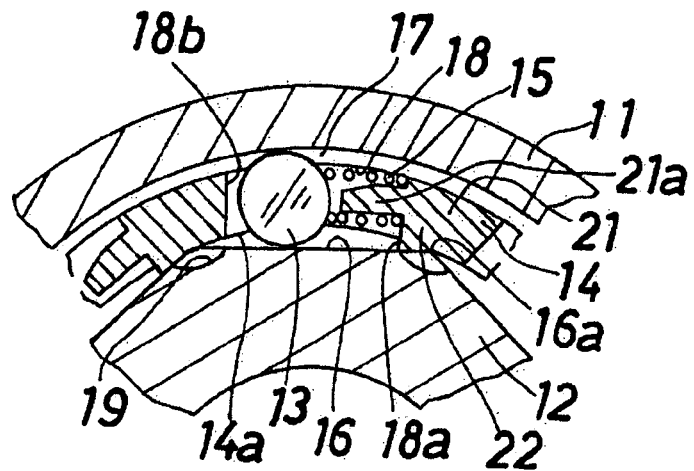
FIGS. 3A to 3C are transverse cross-sectional views showing movements of a roller and a cage in a process of shifting of the one-way clutch from a normal condition to a torque limiter operated condition.

Therefore, in a normal condition (a one-way clutch operated condition) shown in FIG. 3A, each roller 13 can move between the locking position and the free position, and the rotation of the cage 14 in a direction of a reaction force of the coil springs 15 is disenabled by the engagement of each rotation prevention portion 22 with the angle portion 16a of the cam surface 16 of the inner ring 12, and also the rotation of the cage 14 in the opposite direction (that is, in the direction of revolution of the rollers 13 in the overload-applied condition) can be effected since each rotation prevention portion 22 will not be engaged with the angle portion 16a of the cam surface 16.

Figure 3B:
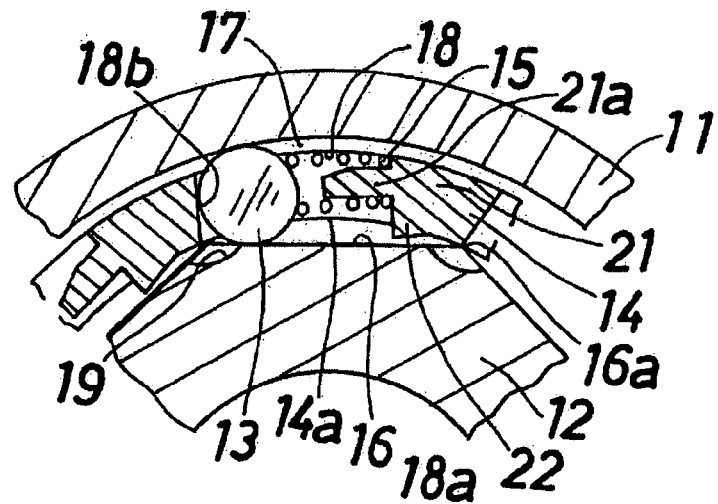
Figure 3C:
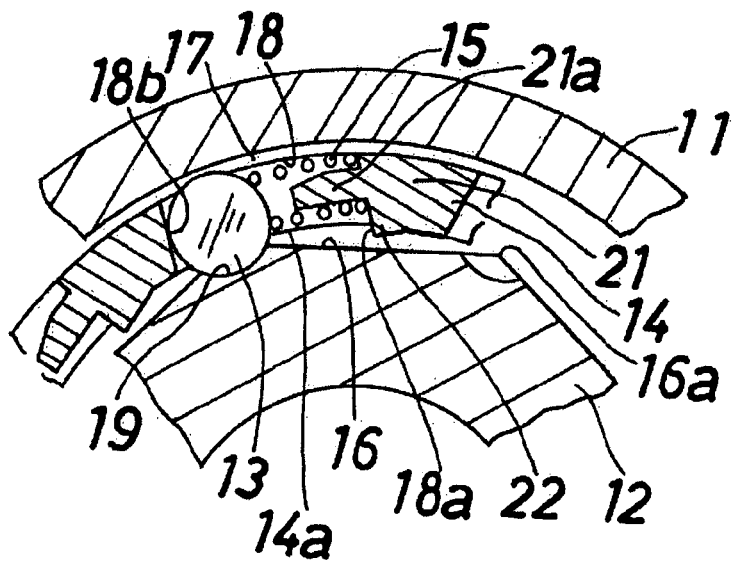

Here, when a large torque load is applied, each roller 13, while bitingly held between the inner ring 12 and the outer ring 11, is forcibly moved into a still narrower portion of the wedge-like space 17. The cage 14 can rotate in the direction of revolution of the rollers 13, and therefore will not prevent the revolution of the rollers 13, but rotates together with the rollers 13 in the counterclockwise direction (in the drawings). At this time, each coil spring 15 is still held between the roller 13 and the spring receiving surface 18a as shown in FIG. 3B. When the roller 13 is further moved in the counterclockwise direction, and is fitted into the recess 19 as shown in FIG. 3C, the inner ring 12 and the outer ring 11 become free relative to each other. The circumferential length of the pocket 18 is smaller than the sum of the diameter of the roller 13 and the free length of the coil spring 15, and therefore even in this condition the coil spring 15 is held between the roller 13 and the spring receiving surface 18a.

Therefore, in a pulley unit (see FIG. 1) for a compressor which is provided with this one-way clutch 10, when the rotation of a rotation shaft 3 becomes abnormal, for example, as a result of a failure of a compressor due to seizure, a loading torque of the one-way clutch 10 increases, and when this loading torque reaches a predetermined value (for example, 60 Nm), each roller 13 is moved beyond the locking position (in the counterclockwise direction in the drawings) into a still narrower portion of the wedge-like space 17, and is fitted into the recess 19 in the cam surface 16. As a result, each roller 13 can not be bitingly held between the two rings 11 and 12, thereby performing the torque limiter function of interrupting the transmission of power from a pulley 5 to the rotation shaft 3 of the compressor 2. As a result, even when an overload is applied, the rotation of the pulley 5 continues, and a rotation loss of a crank shaft will not develop, and a belt 4 will not slip on the pulley 5, and the life of the belt 4 is prolonged, and adverse effects will not be exerted on the compressor 2 and associated equipments connected via the belt 4.

When each roller 13 is to be fitted into the recess 19, the cage 14 moves in the same direction as the direction of revolution of the rollers 13, and the roller 13, while urged by the coil spring 15, is fitted into the recess 19, and the cage 14 will not rotate in the opposite direction. If the coil spring 15 becomes free, there is a possibility that the coil spring 15 is bitingly held between the inner ring 12 and the outer ring 11, so that the locked state is again obtained. However, each coil spring 15 is held between the roller 13 and the spring receiving surface 18a, and will not be bitingly held between the inner ring 12 and the outer ring 11. To increase the free length of the coil spring 15 so that it will not become free is limited. However, by rotating the cage 14 in accordance with the revolution of the rollers 13, the coil springs 15, having the same free length as conventional coil springs, can be restrained even when the torque limiter is operated.

In the above embodiment, although the one-way clutch 10 is used in the pulley unit for the compressor for an automobile air conditioner, the one-way clutch is not limited to this use. Furthermore, in the above one-way clutch, although the cam surfaces are formed on the inner ring, the construction in which the cage can rotate only in the direction of revolution of the rollers can be applied also to a one-way clutch in which cam surfaces are formed on an outer ring.

Second Embodiment

Figure 4:
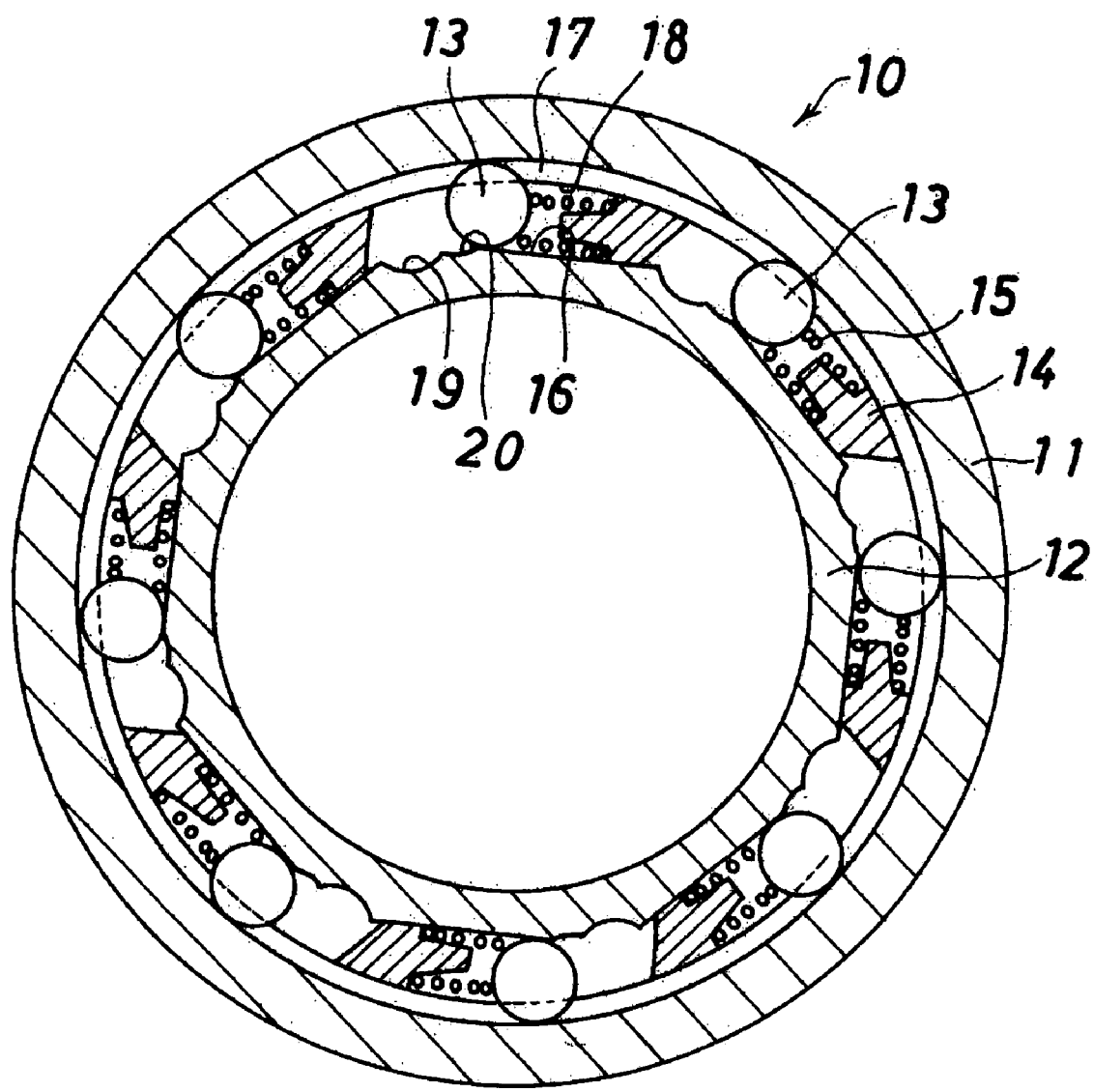
FIG. 4 is a transverse cross-sectional view of a second embodiment of a one-way clutch of the invention.
Figure 5:
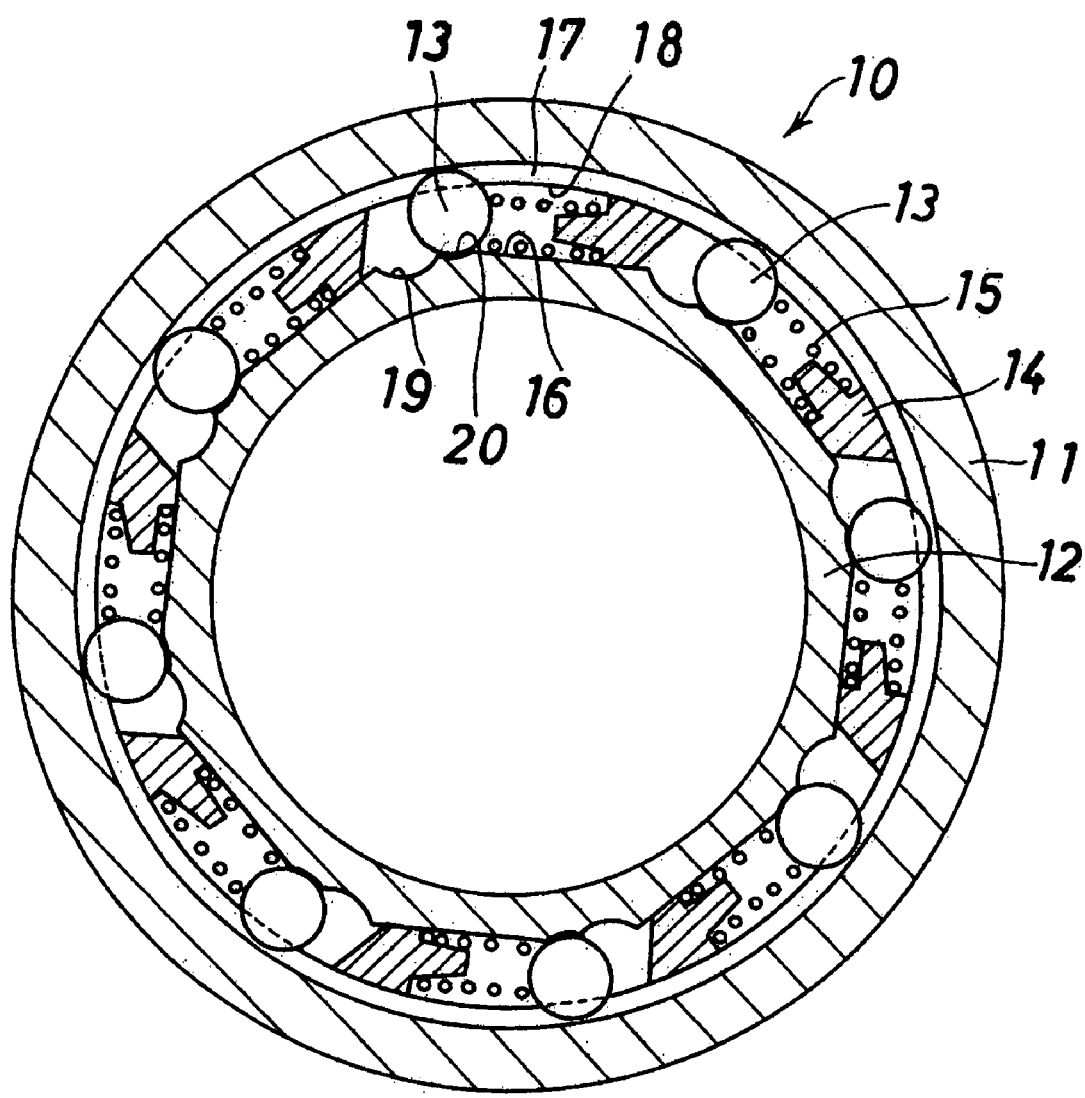
FIG. 5 is a transverse cross-sectional view of the one-way clutch of FIG. 4, showing a condition before it is assembled.
Figure 6:
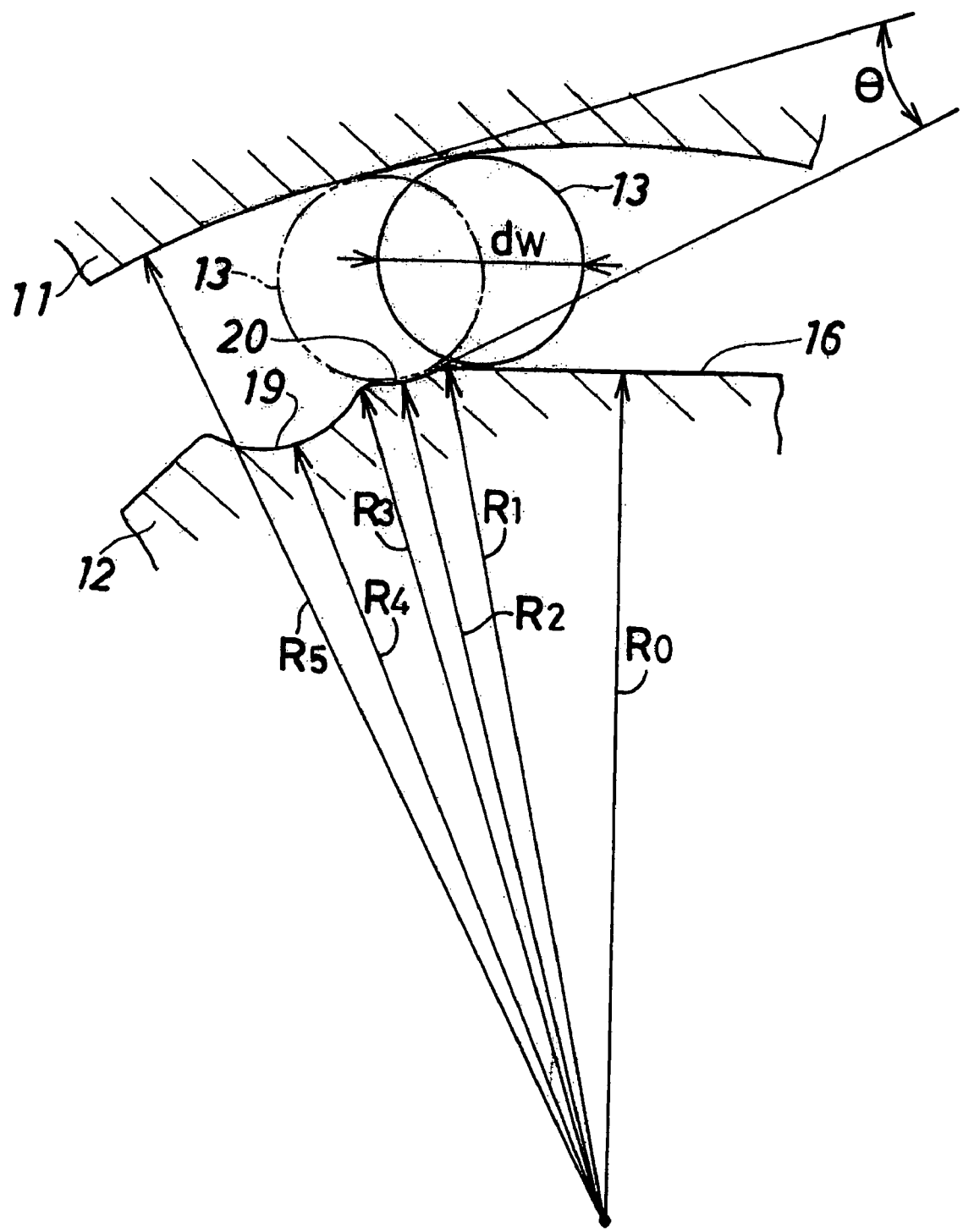
FIG. 6 is a view explanatory of dimensions of portions of the one-way clutch of FIG. 4.

FIGS. 4 to 6 show a second embodiment of a torque limiter-incorporating one-way clutch of the invention.

As shown in FIG. 4, the one-way clutch 10 comprises a cylindrical outer ring 11, an inner ring 12 having an outer peripheral surface of a polygonal shape having cam surfaces 16 each defining a locking position and a free position, a plurality of rollers 13 (serving as biting members) which are disposed respectively in wedge-like spaces 17 each formed between the corresponding cam surface 16 and an inner peripheral surface of the outer ring 11, and are bitingly held between the outer ring 11 and the inner ring 12 upon rotation of the outer and inner rings 11 and 12 relative to each other in one direction (locking direction), and are brought out of biting engagement with the outer and inner rings 11 and 12 upon relative rotation in the other direction (free direction), coil springs (urging members) 15 respectively urging the rollers 13 in the biting direction (toward narrower portions of the respective wedge-like spaces 17), and an annular cage 14 having pockets 18 receiving the respective rollers 13 and coil springs 15 and holding the rollers 13 respectively in the wedge-like spaces 17.

The cam surfaces 16 are formed by the outer peripheral surface of the inner ring 12 which has a polygonal (octagonal in the illustrated embodiment) transverse cross-section. The wedge-like space 17 is formed between a counterclockwise portion of each of eight surfaces (eight sides in a cross-sectional view) of the polygon and the inner peripheral surface of the outer ring 11.

Lock cancellation recesses 19 are formed respectively in those portions of the cam surfaces 16 disposed respectively beyond the locking positions, and when an overload is applied, the rollers 13 are fitted respectively into these lock cancellation recesses 19. Centering recesses 20 for respectively receiving the rollers 13 in such a manner that each roller 13 is fitted between the outer ring 11 and the inner ring 12 with no clearance are formed respectively in the cam surfaces 16, and each centering recess 20 is disposed between the locking position and the lock cancellation recess 19.

When assembling the one-way clutch, the rollers 13 are fitted respectively in the centering recesses 20, and the centering recesses 20 are formed such that the following dimensional relation is established. At the time of shipping the one-way clutch 10 as a product, the rollers 13 are fitted respectively in the centering recesses 20 as shown in FIG. 5. Therefore, the inner and outer rings 12 and 11 of the one-way clutch 10 are aligned with each other.

In FIG. 1, a through hole 32 formed through a disk-like portion 9b of a hub 9 has such a size that a certain degree of clearance is formed between an inner peripheral edge of the through hole 32 and a shank portion of a bolt 33. With this construction, a mounting position of the hub 9 can be finely adjusted in a radial direction, and misalignment of the hub 9 with a rotation shaft 3 can be adjusted.

At the time of shipping the one-way clutch (that is, before the one-way clutch is assembled), the rollers 13 are fitted respectively in the centering recesses 20, so that the one-way clutch 10 is kept in a centered condition (FIG. 5). The one-way clutch 10 and the hub 9 are fixed to a body of a compressor 2, and by doing so, the inner ring 12 is integrally connected to the body of the compressor 2, and also the outer ring 11 and the hub 9 can rotate relative thereto. Finally, a flange 31 and the hub 9 are fastened together by the bolt 33, and by doing so, the outer ring 11 is integrally connected to the rotation shaft 3. After the unit is thus assembled, a torque is applied from the exterior to the rollers 13 (fitted in the respective centering recesses 20) in an opposite direction (clockwise direction in FIG. 5), and by doing so, the rollers 13 are moved in a direction away from the corresponding lock cancellation recesses 19, and are located respectively in the wedge-like spaces 17, in which condition the one-way clutch 10 is used.

In this one-way clutch 10, when the speed of rotation of the outer ring 11 becomes higher than that of the inner ring 12, each roller 13 rolls (in the counterclockwise direction in FIG. 4) into the narrower portion of the wedge-like space 17, thereby achieving the locked state, and as a result the outer ring 11 and the inner ring 12 are connected together in a unitary manner, and therefore rotate in synchronism with each other. However, when the speed of rotation of the outer ring 11 becomes lower than that of the inner ring 12, each roller 13 rolls (in the clockwise direction in FIG. 4) into a wider portion of the wedge-like space 17, thereby achieving the free state, and as a result the transmission of rotating power from the outer ring 11 to the inner ring 12 is interrupted, so that the inner ring 12 continues to rotate only with a rotation inertia force.

When a large torque load is applied, each roller 13, while bitingly held between the inner ring 12 and the outer ring 11, is forcibly moved into a still narrower portion of the wedge-like space 17. When each roller 13 is further moved in the counterclockwise direction, and is fitted into the lock cancellation recess 19, the inner ring 12 and the outer ring 11 become free relative to each other.

Therefore, in a pulley unit 1 for the compressor, when the rotation of the rotation shaft 3 becomes abnormal, for example, as a result of a failure of the compressor due to seizure, a loading torque of the one-way clutch 10 increases, and when this loading torque reaches a predetermined value (for example, 60 Nm), each roller 13 is fitted into the lock cancellation recess 19 in the cam surface 16, thereby performing a torque limiter function of interrupting the transmission of power from a pulley 5 to the rotation shaft 3 of the compressor 2. As a result, even when an overload is applied, the rotation of the pulley 5 continues, and a rotation loss of a crank shaft will not develop, and a belt 4 will not slip on the pulley 5, and the life of the belt 4 is prolonged, and adverse effects will not be exerted on the compressor 2 and associated equipments connected via the belt 4.

Next, preferred conditions for the dimensional relation of the cam surface will be described with reference to FIG. 6. When these conditions are satisfied, the functions (the one-way clutch function (the original function), the torque limiter function, and the centering function required at the time of shipment) of the above one-way clutch are positively performed.

First, the relation, $R0<R5-dw$, and the relation, $R1>R5-dw$, are established. dw represents the diameter of the roller 13, R0 represents a radius of the outer periphery of the cam surface 16 at the free position, R1 represents a radius of the outer periphery of the cam surface 16 at the locking position, and R5 represents a radius of the inner periphery of the outer ring 11. When a torque in an anti-driving direction is applied in a normally-used condition, an idling condition is obtained because of the former relation. When a torque in a driving direction is applied, the locked state is obtained because of the latter relation. These conditions are necessary for performing the original function of the one-way clutch 10.

Further, the relation, $R2>R5-dw$, is established. R2 represents a radius at a bottom of the centering recess 20, and when the roller 13 is fitted into the position of R2, play in the radial direction is eliminated, and a normal load develops. The amounts of deformation at positions of equilibrium of forces for the outer and inner rings 11 and 12, that is, at symmetrical positions (spaced 180 degrees from each other), become equal to each other, and the outer ring 11 and the inner ring 12 are aligned with each other. Here, R2 is so determined that $R1>R2$ and $R3>R2$ are satisfied. R3 represents a radius at a distal end of a projection formed between the centering recess 20 and the lock cancellation recess 19, and with this configuration, each roller 13 is retained at the position of R2 at the time of shipment.

R1 and R3 between which R2 is disposed are so determined that $R1>R3$ is established. With this configuration, a torque for passing the roller 13 past the R3 portion is smaller than a torque for passing the roller 13 past the R1 portion, and when the roller 13 passes over the R1 portion upon operation of the torque limiter, the roller 13 can easily pass over the R3 portion, and will not stop at the R2 portion, that is, at the centering recess 20. Namely, if the roller 13 stops at the R2 portion, the torque is partially transmitted, and therefore can not be interrupted. However, when an excessive torque large enough to operate the torque limiter is applied, the roller 13 passes over the R3 portion without fail, and is positively moved into an R4 portion, that is, the lock cancellation recess 19.

R4 represents a radius at a bottom of the lock cancellation recess 19, and R4 is so determined that $R4<R5-dw$ is established. As a result, when the roller 13 is fitted into the R4 portion, a clearance is formed between the roller 13 and the outer ring 11, and therefore the torque can be positively interrupted.

$\theta$ represents a wedge angle (an angle formed by a tangential line at a position of contact between the bitingly-engaged roller 13 and the inner ring 12 and a tangential line at a position of contact between the roller 13 and the outer ring 11), and $\theta<10°$ is established. Therefore, in an ordinary temperature, $\mu$ (friction coefficient)$>\tan \theta/2$ is established, and the roller 13a can move from the R0 portion (a wider portion of the wedge-like space 17) to the R1 portion (the narrower portion of the wedge-like space 17) to be bitingly held between the inner and outer rings, thereby obtaining the one-way clutch function.

Further, $R1-R5+dw<\delta1$ and $R2-R5+dw<\delta2$ are established where $\delta1$ represents a limit value of the deformation amount obtained when the roller 13 passes over the R1 portion, and $\delta2$ represents a limit value of the deformation amount obtained when the roller 13 is fitted into the R2 portion (that is, at the time of shipping the one-way clutch). For example, in the case of steel, $\delta1$ is set to such a value that a contact pressure is not more than 4,000 MPa so that permanent deformation adversely affecting the lock/free function will not occur. $\delta2$ is set to such a value that permanent deformation will not occur even when such deformation is left as it is, and for example, in the case of steel, the limit value $\delta2$ is so determined that a contact pressure is not more than 1,000 MPa.

In the above second embodiment, although the one-way clutch 10 is, used in the pulley unit for the compressor for an automobile air conditioner, the one-way clutch is not limited to this use. Furthermore, in the above one-way clutch 10, although the cam surfaces are formed on the inner ring, the construction in which the centering recesses are formed can be applied also to a one-way clutch in which cam surfaces are formed on an outer ring.

Third Embodiment

Figure 7:
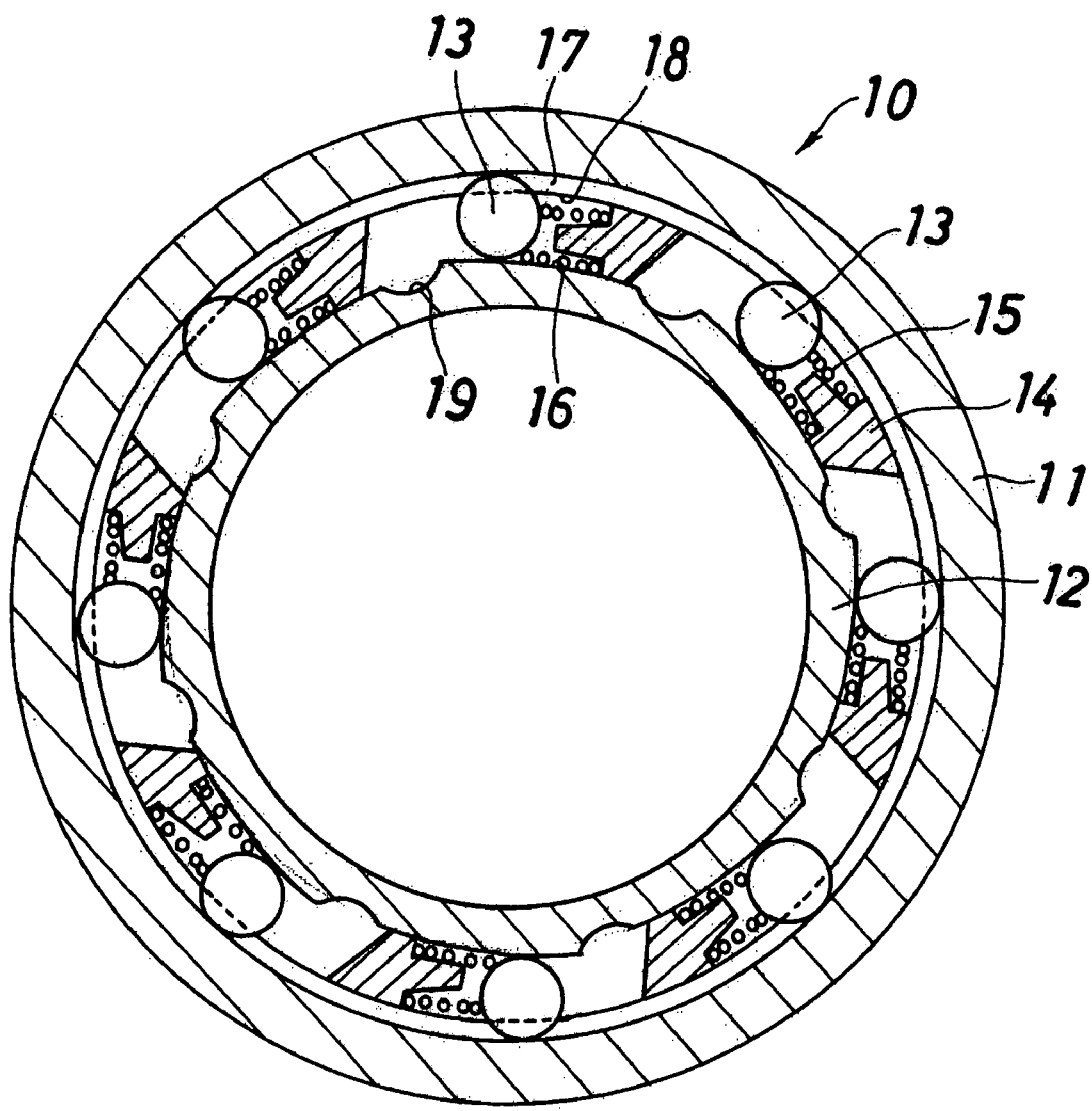
FIG. 7 is a transverse cross-sectional view of a third embodiment of a torque limiter-incorporating one-way clutch of the invention.
Figure 8A:
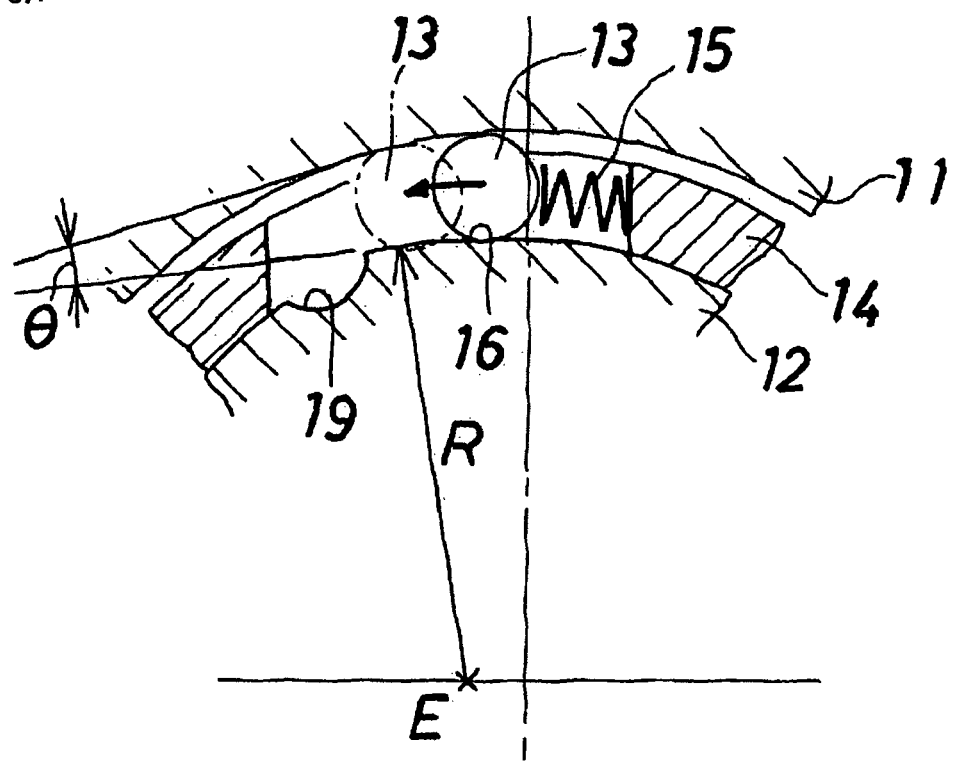
FIG. 8A is a view explanatory of a wedge angle at a cam surface of the torque limiter-incorporating one-way clutch of FIG. 7, and FIG. 8B a view explanatory of a wedge angle at a cam surface of a conventional torque limiter-incorporating one-way clutch.

FIGS. 7 and 8A show a third embodiment of a torque limiter-incorporating one-way clutch of the invention.

This one-way clutch 10 is used as the one-way clutch 10 shown in FIG. 1, and comprises a cylindrical outer ring 11, an inner ring 12 having an outer peripheral surface of a polygonal shape having cam surfaces 16 each defining a locking position and a free position, a plurality of rollers 13 (serving as biting members) which are disposed respectively in wedge-like spaces 17 each formed between the corresponding cam surface 16 and an inner peripheral surface of the outer ring 11, and are bitingly held between the outer ring 11 and the inner ring 12 upon rotation of the outer and inner rings 11 and 12 relative to each other in one direction (locking direction), and are brought out of biting engagement with the outer and inner rings 11 and 12 upon relative rotation in the other direction (free direction), coil springs (urging members) 15 respectively urging the rollers 13 in the biting direction (toward narrower portions of the respective wedge-like spaces 17), and an annular cage 14 having pockets 18 receiving the respective rollers 13 and coil springs 15 and holding the rollers 13 respectively in the wedge-like spaces 17.

The cam surfaces 16 are formed respectively by eccentric radius cam-shaped portions (of an arc-shaped cross-section) of the polygonal outer peripheral surface of the inner ring 12. The wedge-like space 17 is formed between a counterclockwise portion of each of the surfaces (sides in a cross-sectional view) of the polygon and the inner peripheral surface of the outer ring 11. With respect to the eccentric radius cam shape, as shown in detail in FIG. 8A, the cam surface 16 has such a transverse cross-section that the cam surface 16 is defined by an arc-shaped surface disposed on a circle having its center E eccentric from the center of the one-way clutch 10 and having a radius R smaller than the distance from the center of the one-way clutch 10 to the cam surface 16. The arc-shaped surface has the radius R smaller than the distance from the center of the one-way clutch 10 to the cam surface 16, and therefore the cage 14 can not rotate in a direction (clockwise direction in FIG. 7) opposite to a direction of revolution of the rollers 13 in an overload-applied condition. With respect to the transverse cross-section of the cam surface 16, the cam surface 16 does not always need to be defined entirely by the arc-shaped surface, and instead that portion of the cam surface extending from the free position or the locking position to a lock cancellation recess 19 can be defined by an arc-shaped surface, in which case that portion of the cam surface extending from this arc-shaped surface in the clockwise direction is formed into a straight surface (part of the polygon).

In order to prevent engagement slip, at the narrower portion of the wedge-like space 17 (that is, at the locking position), a wedge angle θ (an angle formed by a tangential line at a position of contact between the bitingly-engaged roller 13 and the inner ring 12 and a tangential line at a position of contact between the roller 13 and the outer ring 11) is so determined that $\tan(\theta/2) < \mu$ is established, where $\mu$ represents a friction coefficient. The cam surface 16 is formed into the eccentric radius cam shape, and by doing so, the wedge angle at a region between the locking position and the lock cancellation recess 19 is smaller than the wedge angle at the locking position. Therefore, even at the region between the locking position and the lock cancellation recess 19, $\tan(\theta/2) < \mu$ (which is a necessary condition for preventing the engagement slip) is established.

The inner ring 12 has the lock cancellation recesses 19 each formed in that portion of the cam surface 16 disposed beyond the locking position, and when an overload is applied, the rollers 13 are fitted respectively into these lock cancellation recesses 19.

In this one-way clutch 10, when the speed of rotation of the outer ring 11 becomes higher than that of the inner ring 12, each roller 13 rolls (in the counterclockwise direction in the drawings) into the narrower portion of the wedge-like space 17, thereby achieving the locked state, and as a result the outer ring 11 and the inner ring 12 are connected together in a unitary manner, and therefore rotate in synchronism with each other. However, when the speed of rotation of the outer ring 11 becomes lower than that of the inner ring 12, each roller 13 rolls (in the clockwise direction in the drawings) into a wider portion of the wedge-like space 17, thereby achieving the free state, and as a result the transmission of rotating power from the outer ring 11 to the inner ring 12 is interrupted, so that the inner ring 12 continues to rotate only with a rotation inertia force.

When a large torque load is applied, each roller 13, while bitingly held between the inner ring 12 and the outer ring 11, is forcibly moved into a still narrower portion of the wedge-like space 17. When each roller 13 is further moved in the counterclockwise direction, and is fitted into the lock cancellation recess 19, the inner ring 12 and the outer ring 11 become free relative to each other.

Figure 8B:
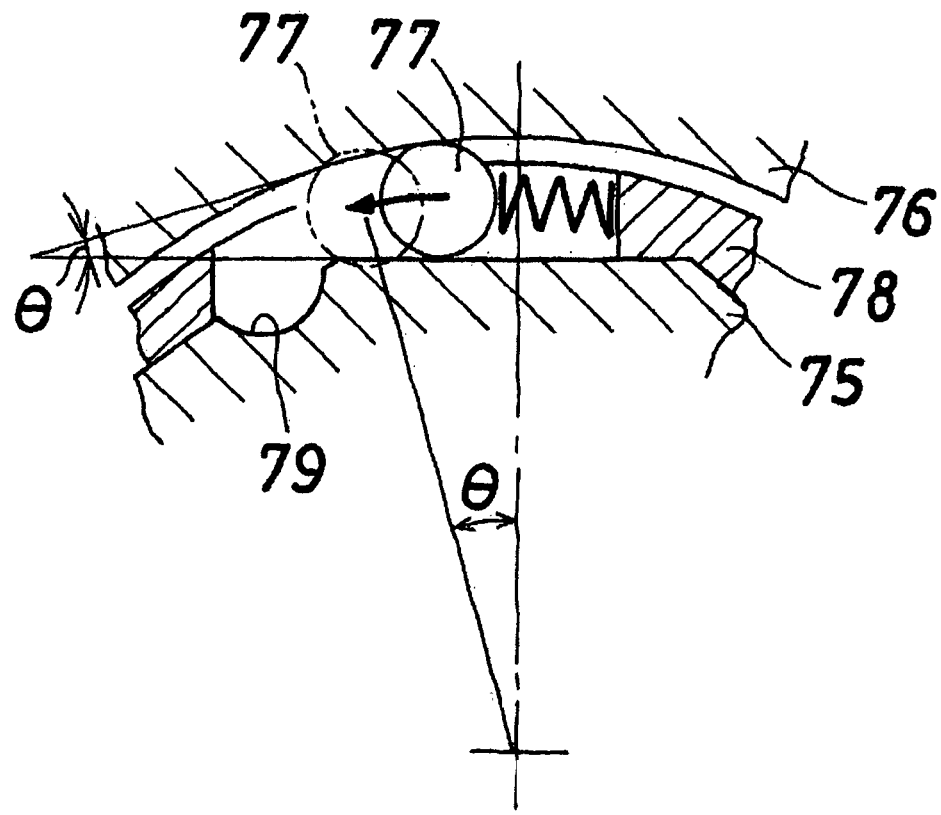

In a conventional torque limiter-incorporating one-way clutch shown in FIG. 8B, when a torque load is applied, and each roller 77 moves, a wedge angle θ increases, and $\tan(\theta/2) > \mu$ is established before the roller 77 reaches a lock cancellation recess 79, which leads to a possibility that engagement slip occurs. On the other hand, in the torque limiter-incorporating one-way clutch 10 of this invention, $\mu > \tan(\theta/2)$ is secured with respect to the wedge angle θ before the torque limiter is operated, and engagement slip is positively prevented.

Therefore, in a pulley unit for a compressor, when the rotation of a rotation shaft 3 becomes abnormal, for example, as a result of a failure of the compressor due to seizure, a loading torque of the one-way clutch 10 increases, and when this loading torque reaches a predetermined value (for example, 60 Nm), each roller 13 is moved beyond the locking position (in the counterclockwise direction in the drawings) into a still narrower portion of the wedge-like space 17, and is fitted into the lock cancellation recess 19 in the cam surface 16 without causing engagement slip. As a result, each roller 13 can not be bitingly held between the two rings 11 and 12, thereby performing the torque limiter function of interrupting the transmission of power from a pulley 5 to the rotation shaft 3 of the compressor 2. As a result, even when an overload is applied, damage of the one-way clutch 10 by engagement slip is prevented, and besides thereafter the rotation of the pulley 5 continues, and a rotation loss of a crank shaft will not develop, and a belt 4 will not slip on the pulley 5, and the life of the belt 4 is prolonged, and adverse effects will not be exerted on the compressor 2 and associated equipments connected via the belt 4. In the above third embodiment, although the one-way clutch 10 is used in the pulley unit for the compressor for an automobile air conditioner, the one-way clutch is not limited to this use. Furthermore, in the above one-way clutch 10, although the cam surfaces 16 are formed on the inner ring 12, the construction in which the above wedge angle is provided can be applied also to a one-way clutch in which cam surfaces are formed on an outer ring.

Fourth Embodiment

Figure 9:
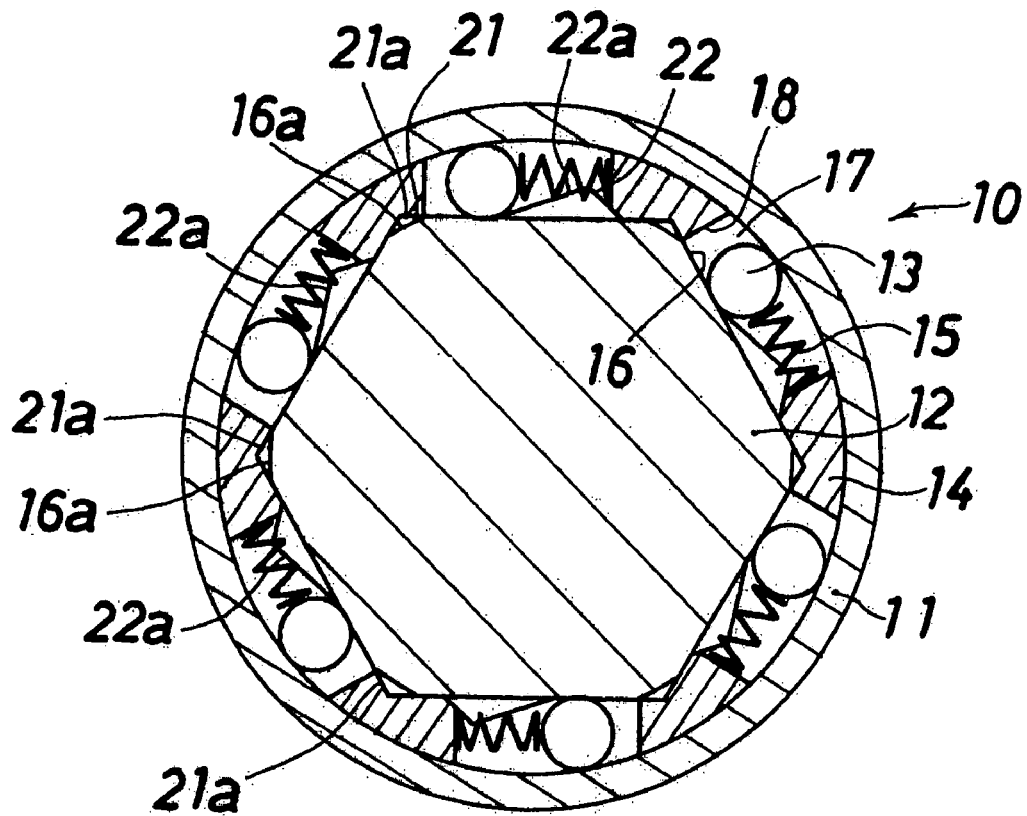
FIG. 9 is a transverse cross-sectional view of a fourth embodiment of a one-way clutch of the invention in its normal condition.
Figure 10:
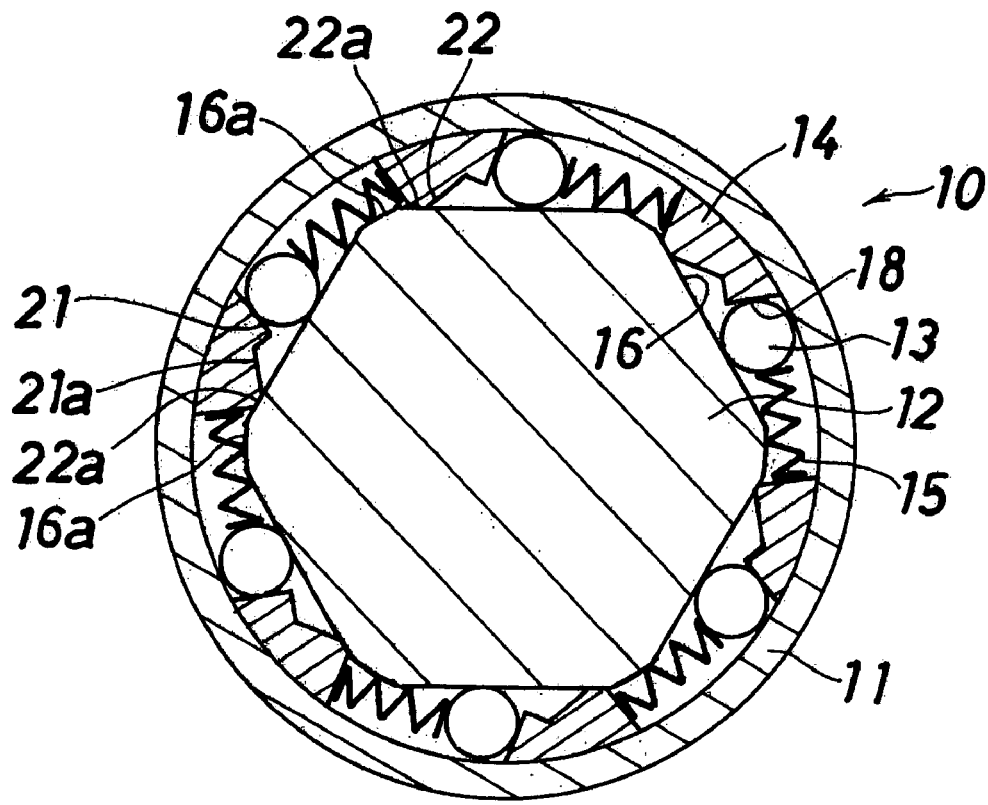
FIG. 10 is a transverse cross-sectional view of the one-way clutch of FIG. 9 in its torque limiter-operated condition.

FIGS. 9 and 10 show a fourth embodiment of a torque limiter-incorporating one-way clutch of the invention.

The one-way clutch 10 is used as the one-way clutch 10 shown in FIG. 1, and comprises a cylindrical outer ring 11, an inner ring 12 having an outer peripheral surface of a polygonal shape having cam surfaces 16 each defining a locking position and a free position, a plurality of rollers 13 (serving as biting members) which are disposed respectively in wedge-like spaces 17 each formed between the corresponding cam surface 16 and an inner peripheral surface of the outer ring 11, and are bitingly held between the outer ring 11 and the inner ring 12 upon rotation of the outer and rings 11 and 12 relative to each other in one direction (locking direction), and are brought out of biting engagement with the outer and inner rings 11 and 12 upon relative rotation in the other direction (free direction), coil springs (urging members) 15 respectively urging the rollers 13 in the biting direction (toward narrower portions of the respective wedge-like spaces 17), and an annular cage 14 having pockets 18 receiving the respective rollers 13 and coil springs 15 and holding the rollers 13 respectively in the wedge-like spaces 17.

The cam surfaces 16 are formed by the outer peripheral surface of the inner ring 12 which has a polygonal (hexagonal in the illustrated embodiment) transverse cross-section. The wedge-like space 17 for achieving a locked state and a free state in a normal operation (normal condition) is formed between a counterclockwise portion of each of six surfaces (six sides in a cross-sectional view) of the polygon and the inner peripheral surface of the outer ring 11. An angle portion 16a of each cam surface 16 is chamfered into a round shape.

A circumferential length of each pocket 18 of the cage 14 is smaller than the sum of an outer diameter of the roller 13 and a free length of the coil spring 15, and an axial length of the pocket 18 of the cage 14 is larger than an axial length of the roller 13. Therefore, each roller 13, while guided by the pocket 18, can be moved between the locking position and the free position.

An inner peripheral surface of the cage 14 has a shape formed by combining a polygonal inner peripheral surface corresponding to the polygonal cam surface (cam surfaces 16) of the inner ring 12 with a polygonal inner peripheral surface which is rotated (or angularly moved) a predetermined angle relative to the first-mentioned polygonal inner peripheral surface. With this configuration, a plurality of (six in this embodiment) normal-condition phase determining portions 21 each comprising an angle portion 21a, as Well as a plurality of (six in this embodiment) of overload-condition phase determining portions 22 each comprising an angle portion 22a, are formed at the cage 14. The angle portions 21a are fitted respectively on the angle portions 16a of the cam surfaces 16 in the normal condition shown in FIG. 9. In the normal condition shown in FIG. 9, the angle portions 22a are angularly spaced clockwise a predetermined angle from the respective angle portions 16a of the cam surfaces 16, and when the cage 14 is rotated relative to the cam surfaces 16 in an overload-applied condition as shown in FIG. 10, the angle portions 22a are fitted respectively on the angle portions 16a of the cam surfaces 16. Here, this predetermined angle is so determined that when the cage 14 is forcibly rotated relative to the cam surfaces 16 from the position (the normal condition) of FIG. 9 to the position (the overload-applied condition) of FIG. 10, each roller 13 is located at a wider portion (that is, the free position) formed between a clockwise portion of the cam surface 16 and the inner peripheral surface of the outer ring 11.

In this one-way clutch 10, when the speed of rotation of the outer ring 11 becomes higher than that of the inner ring 12, each roller 13 rolls (in the counterclockwise direction in the drawings) into the narrower portion of the wedge-like space 17, thereby achieving the locked state, and as a result the outer ring 11 and the inner ring 12 are connected together in a unitary manner, and therefore rotate in synchronism with each other. However, when the speed of rotation of the outer ring 11 becomes lower than that of the inner ring 12, each roller 13 rolls (in the clockwise direction in the drawings) into the wider portion of the wedge-like space 17, thereby achieving the free state, and as a result the transmission of rotating power from the outer ring 11 to the inner ring 12 is interrupted, so that the inner ring 12 continues to rotate only with a rotation inertia force.

In the normal condition (in the one-way clutch operated condition) shown in FIG. 9, each roller 13 can move between the locking position and the free position, and the angle portions 21a of the normal condition phase determining portions 21 are engaged respectively with the angle portions 16a of the cam surfaces 16, and therefore the cage 14 can not rotate. The cage 14 is made of a resin, and can be relatively easily deformed in a radial direction because of the provision of the angle portions 22a of the overload-condition phase determining portions 22.

In an abnormal condition (overload-applied condition), each roller 13 revolves beyond the locking position because of an applied large torque load. At this time, the roller 13 is brought into abutting engagement with a surface of the pocket 18 (of the cage 14) to which this roller 13 faces. However, since the torque acting on the rollers 13 is large, the cage 14 is pushed by the rollers 13, and rotates together with the rollers 13. Then, at the time when the angle portions 22a of the overload-condition phase determining portions 22 of the cage 14 are fitted respectively on the angle portions 16a of the cam surfaces 16, the rotation of the cage 14 is stopped. At this time, the rollers 13 are in a free condition, thus achieving a torque limiter function.

Therefore, in a pulley unit (see FIG. 1) for a compressor which is provided with this one-way clutch 10, when the rotation of a rotation shaft 3 becomes abnormal, for example, as a result of a failure of the compressor 2 due to seizure, a loading torque of the one-way clutch 10 increases, and when this loading torque reaches a predetermined value (for example, 60 Nm), the cage 14 is rotated, so that each roller 13 can not be bitingly held between the two rings 11 and 12, thereby performing the torque limiter function of interrupting the transmission of power from a pulley 5 to the rotation shaft 3 of the compressor 2. As a result, even when an overload is applied, the pulley 5 continues to rotate, and a rotation loss of a crank shaft will not develop, and a belt 4 will not slip on the pulley 5, and the life of the belt 4 is prolonged, and adverse effects will not be exerted on the compressor 2 and associated equipments connected via the belt 4.

In the fourth embodiment, although the one-way clutch 10 is used in the pulley unit for the compressor for an automobile air conditioner, the one-way clutch is not limited to this use. Furthermore, in the above one-way clutch, although the cam surfaces are formed on the inner ring, the construction in which the cage has two kinds of phase determining portions can be applied also to a one-way clutch in which cam surfaces are formed on an outer ring.

Fifth Embodiment

Figure 11:
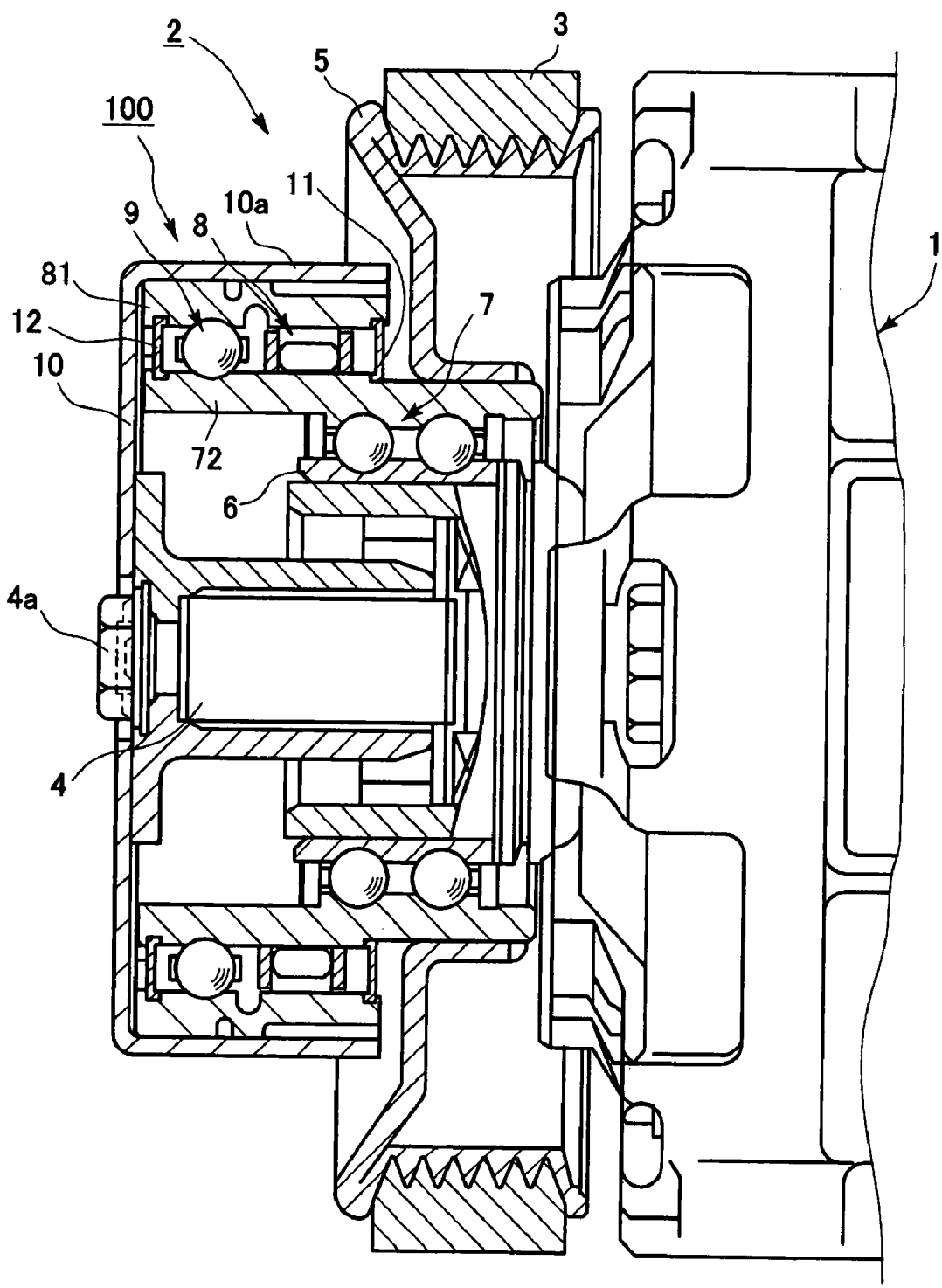
FIG. 11 is a longitudinal cross-sectional view of a pulley unit in which a fifth embodiment of a one-way clutch unit of the invention is mounted.
Figure 12A:
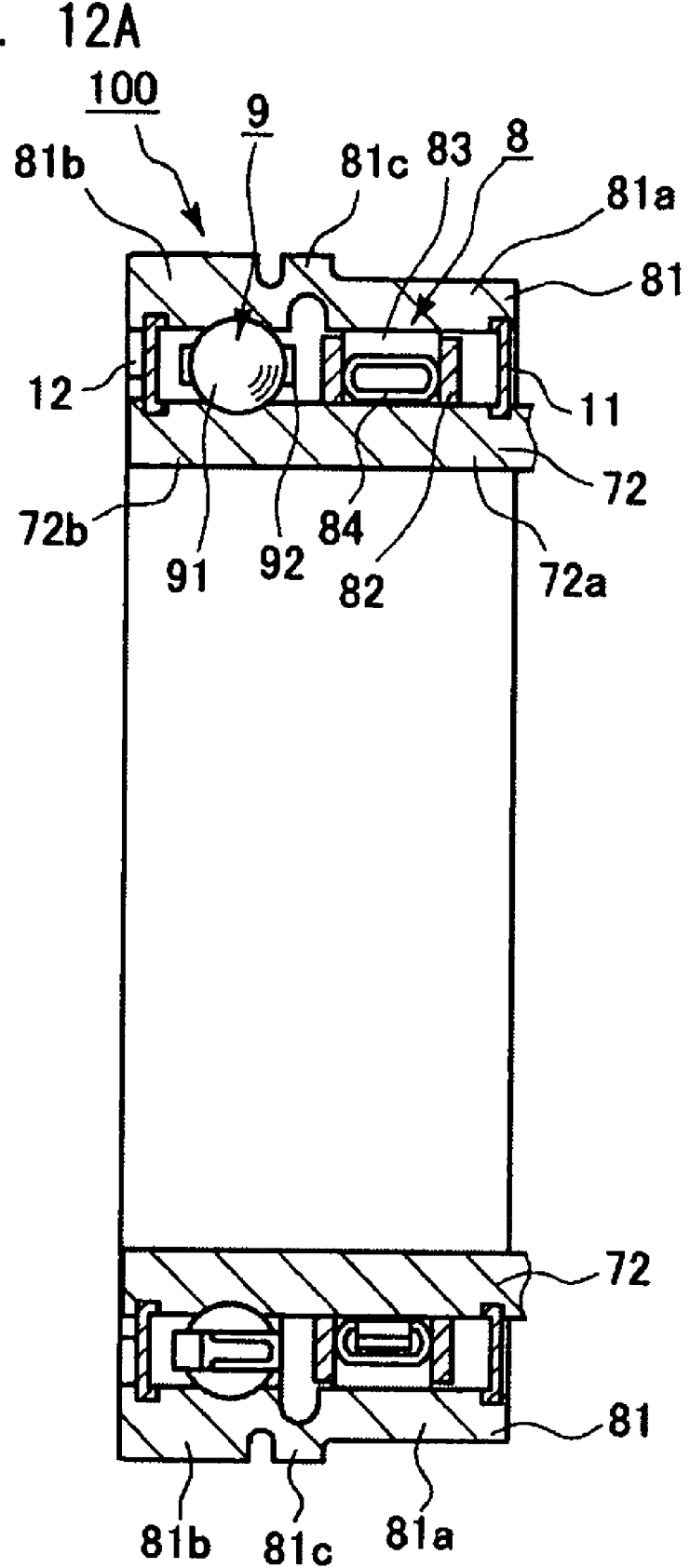
FIGS. 12A and 12B are a side cross-sectional view and a front cross-sectional view of the one-way clutch unit of FIG. 11, respectively.
Figure 12B:
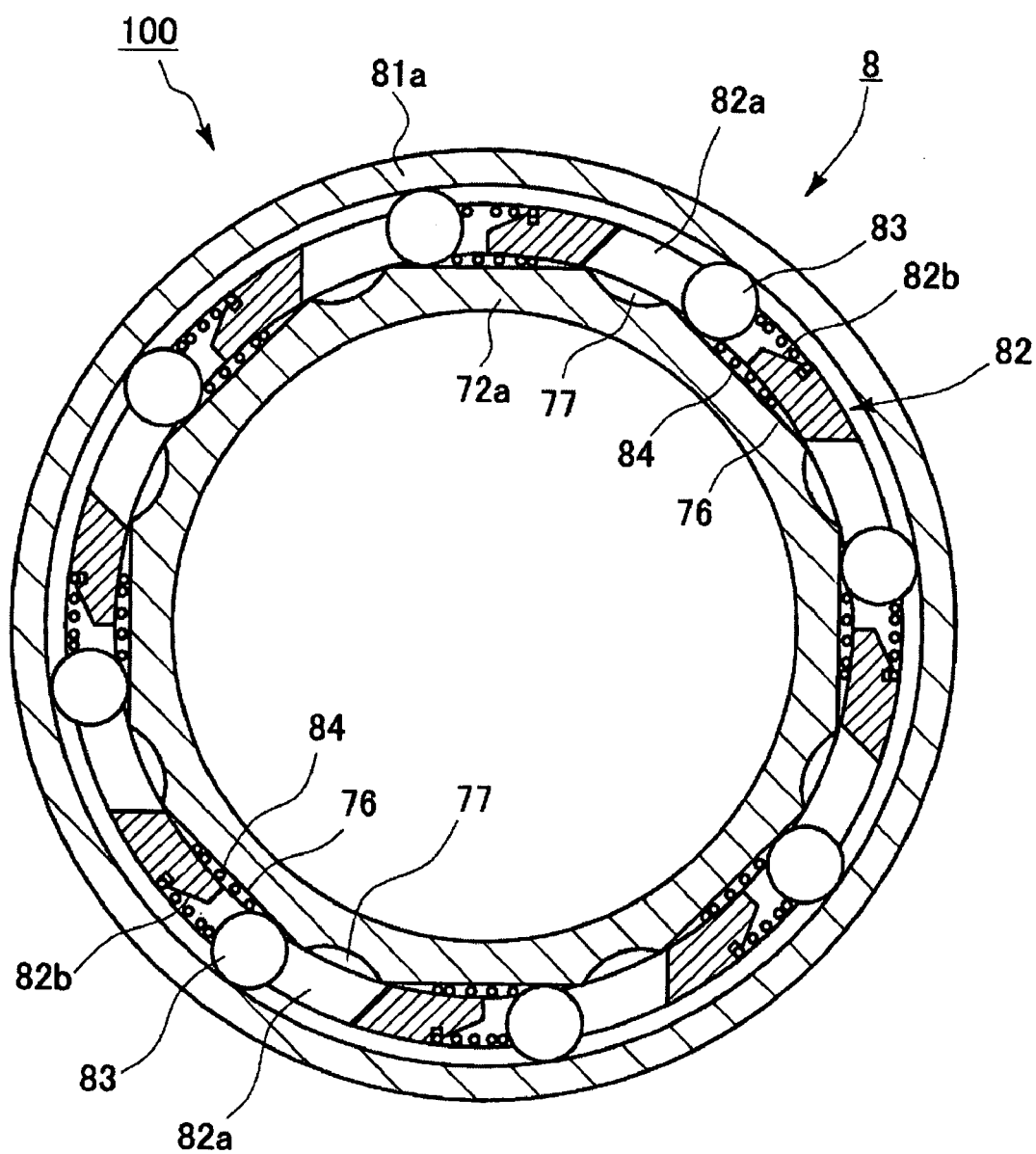
Figure 13:
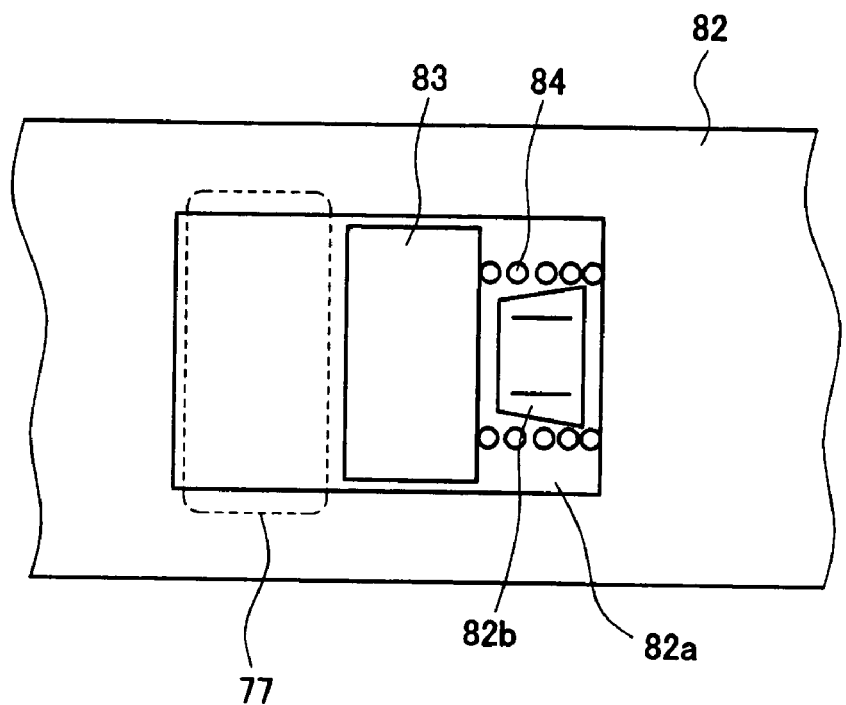
FIG. 13 is a plan developed view showing a pocket of a one-way clutch.
Figure 14:
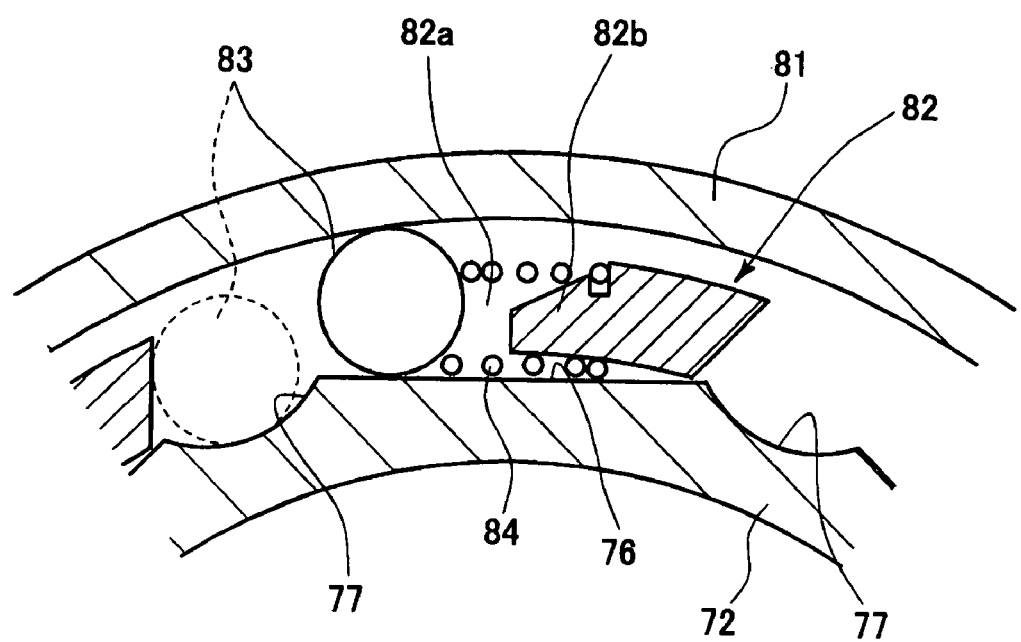
FIG. 14 is cross-sectional view showing an important portion of the one-way clutch.
Figure 15A:
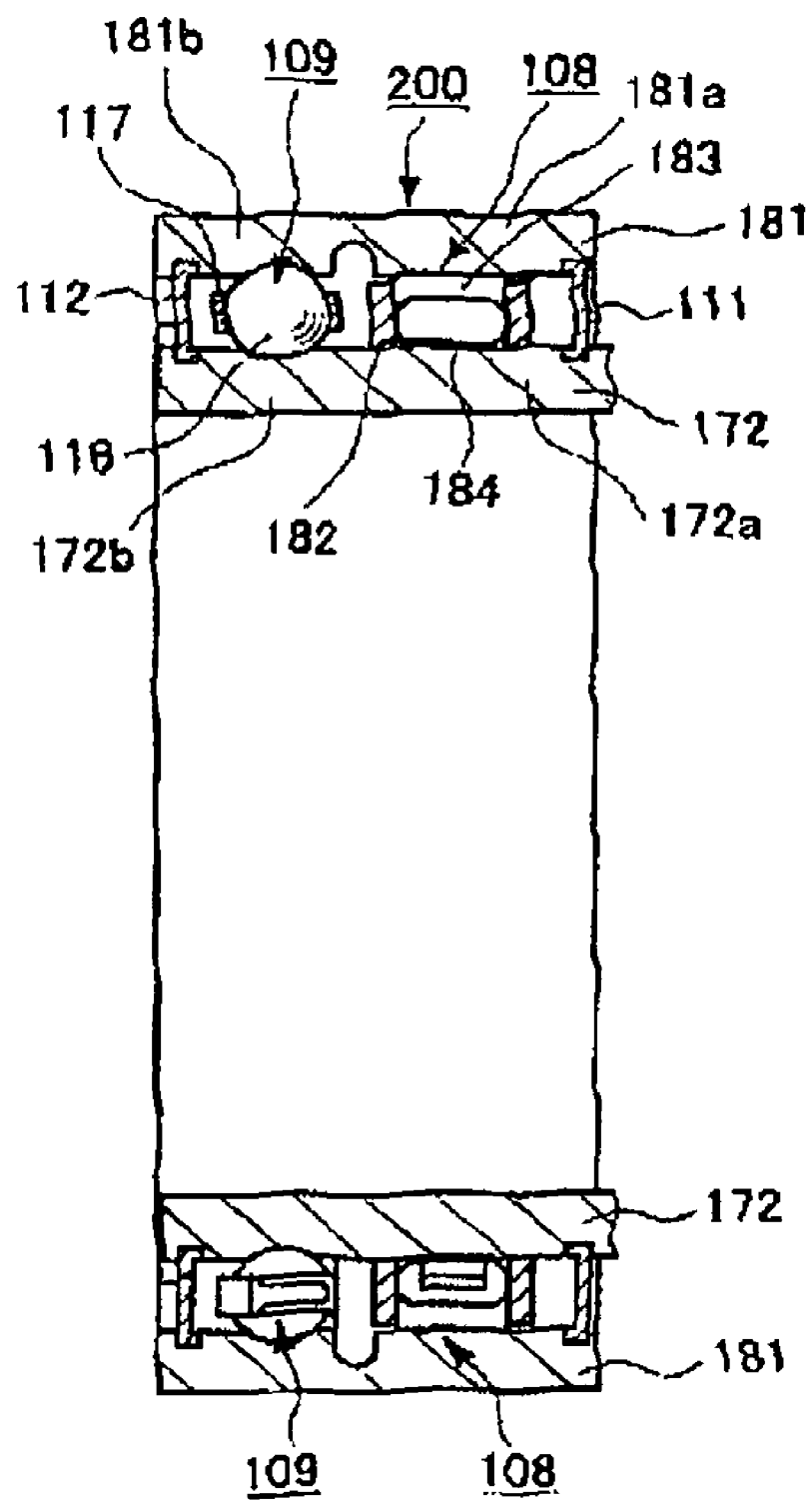
FIGS. 15A and 15B are a side cross-sectional view and a front cross-sectional view of a conventional one-way clutch unit, respectively.
Figure 15B:
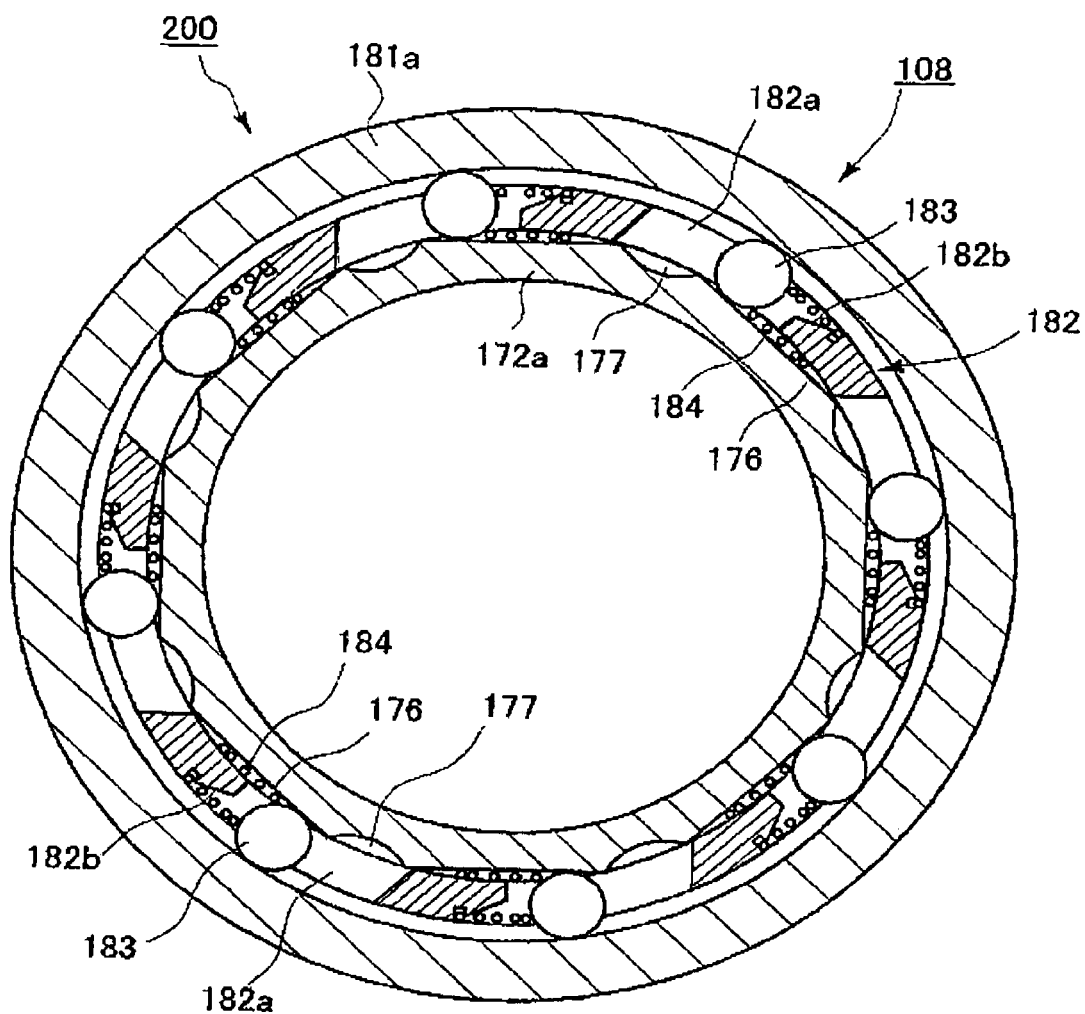

FIG. 11 is a side cross-sectional view of a pulley unit provided with a fifth embodiment of a one-way clutch unit of the invention, FIGS. 12A and 12B are a side cross-sectional view and a front cross-sectional view of a one-way clutch, respectively, FIG. 13 is a plan developed view showing a pocket of the one-way clutch, and FIG. 14 is a cross-sectional view of an important portion of the one-way clutch. In the drawings, reference numeral 1 denotes a compressor of an air conditioner as an engine auxiliary equipment, reference numeral 2 denotes the pulley unit, reference numeral 3 denotes a belt, and reference numeral 100 denotes the one-way clutch unit.

Although its detailed construction is not shown, the compressor 1 is a so-called continuous variable capacity type well known in the art, and for example as in a cam plate type or a waffle type, a stroke of a reciprocal piston is changed by changing an inclination angle of a cam plate of a piston driving mechanism so as to continuously vary a discharge of the compressor in the range from 0% to 100%. Incidentally, when the cam plate is brought into a neutral posture, the compressor 1 is switch to an OFF state in which a compressing operation is not effected, and this compressor 1 is not provided with an electromagnetic clutch which is usually used for the on-off control of a compressor. In the compressor 1 of this type, if a rotation shaft 4 should be locked as a result of a failure due to seizure, a torque limiter function (described later) of the one-way clutch unit 100 is performed to interrupt the transmission of power to the compressor 1, thereby protecting the compressor 1.

The pulley unit 2 is mounted on the rotation shaft 4 of the compressor 1, and is rotated by a crank shaft of an automobile engine (not shown) via the belt 3. This pulley unit 2 comprises a pulley 5, a hollow shaft 6, a double row rolling bearing 7, and the one-way clutch unit 100.

The one-way clutch unit 100 includes the one-way clutch 8 and a support bearing 9, and with this construction the one-way clutch unit 100 is designed to perform the function of absorbing a variation of rotation of the pulley 5 due to a variation in tension of the belt 3 and also to perform the torque limiter function of interrupting the transmission of power from the belt 3 to the rotation shaft 4 of the compressor 1 when an overload is applied.

A wavy groove is formed in an outer periphery of the pulley 5, and the belt 3 is extended around this wavy groove portion.

The hollow shaft 6 is passed through an inner periphery of the pulley 5, and is fixed to the rotation shaft 4 of the compressor 1.

The double row rolling bearing 7 is interposed between the pulley 5 and the hollow shaft 6, and is in the form of an angular contact ball bearing comprising an inner ring, an outer ring (which is a one-piece inner ring 72 described later), a plurality of balls (rolling elements) and two cages arranging the rolling elements in two rows. Seal members are provided at the double row rolling bearing 7 so as to prevent leakage of lubricant (such as grease) sealed in the bearing 7.

FIGS. 12A and 12B are the side cross-sectional view and the front cross-sectional view of the one-way clutch unit 100, respectively. The one-way clutch unit 100 includes the single-row one-way clutch 8 and the single-row support bearing 9 (in the form of a single row ball bearing) which are disposed adjacent to each other in an axial direction. The one-way clutch unit 100 includes a one-piece outer ring 81, and the one-piece inner ring 72. The one-piece outer ring 81 includes a clutch outer ring portion 81a for the one-way clutch 8 and a bearing outer ring portion 81b for the support bearing 9 which are integral with each other. The one-piece inner ring 72 includes a clutch inner ring portion 72a for the one-way clutch 8 and a bearing inner ring portion 72b for the support bearing 9 which are integral with each other.

The one-way clutch 8 is provided in a path of transmission of power from the pulley 5 to the rotation shaft 4 of the compressor 1. This one-way clutch 8 comprises the clutch inner ring portion 72a, the clutch outer ring portion 81a, an annular cage 82 made of a synthetic resin, a plurality of engagement rollers 83, and urging springs (coil springs of an oval cross-section) 84.

The one-piece inner ring 72 serves also as the outer ring of the double row rolling bearing 7 on which the pulley 5 is fixedly fitted. Flat cam surfaces 76 jointly assuming an octagonal shape are formed on an outer peripheral surface of the clutch inner ring portion 72a. A wedge-like space is formed between each cam surface 76 and that portion of a cylindrical inner peripheral surface of the clutch outer ring portion 81a opposed to this cam surface 76, and the wedge like space is narrowing toward one side in a circumferential direction. A lock cancellation recess 77 of a generally semi-circular cross-section is formed in each cam surface 76, and when an overload is applied, the engagement roller 83 is fitted into the lock cancellation recess 77, and is retained there.

The one-piece outer ring 81 is fitted in and fixed to an inner periphery of a cylindrical portion 10a of an annular plate 10 fixed to an end portion of the rotation shaft 4 (to which the hollow shaft 6 is fixed) of the compressor 1 by a cap nut 4a. The clutch outer ring portion 81a of the one-piece outer ring 81 has a cylindrical inner peripheral surface.

The cage 82 has inner peripheral surface portions jointly assuming an octagonal shape, and these inner peripheral surface portions are fitted respectively to the cam surfaces 76 (jointly assuming an octagonal shape) of the clutch inner ring portion 72a. The cage 82 is fitted on the clutch inner ring portion 72a in such a manner that the former is positioned relative to the latter in the circumferential direction and the axial direction. Pockets 82a are formed radially respectively through those portions of the cage 82 corresponding respectively to the eight cam surfaces 76. As shown in FIGS. 13 and 14, each engagement roller (wedge member) 83, while urged by the urging spring 84, is rollably received in the corresponding pocket 82a.

The engagement roller 83 is in the form of a cylindrical member made of steel, and the engagement rollers 83 are received respectively in the pockets 82a of the cage 82 so as to roll in the circumferential direction. Although the engagement roller 83 is used as the wedge member, a ball can be used as the wedge member.

Each urging spring 84 is attached to a projection 82b formed on and projecting from an inner wall surface of the pocket 82a of the cage 82, and urges the engagement roller 83 toward a narrower portion of the wedge-like space (that is, toward a locking side) formed by the cam surface 76 and the inner peripheral surface of the clutch outer ring portion 81a. Although the coil spring is used as the urging spring, a leaf spring or a coned disk spring can be used as the urging spring.

In the one-way clutch 8, at a region where each engagement roller 83 shifts to the lock cancellation recess 77, a thickness of the clutch outer ring portion 81a is smaller than a thickness of the clutch inner ring portion 72a when viewed in cross-section. For example, the thickness of the clutch outer ring portion 81a is not more than 90% of the thickness of the clutch inner ring portion 72a, and preferably not more than 70%. With this construction, when the engagement rollers 83 are to be fitted into the respective lock cancellation recesss 77, the clutch outer ring portion 81a is mainly elastically deformed, and by controlling the thickness of the clutch outer ring portion 81a, the precision of the torque limiter-operating torque in the torque limiter function of the one-way clutch 8 can be enhanced. More specifically, the torque limiter-operating torque in the torque limiter function of the one-way clutch 8 is determined by the thickness of the clutch outer ring portion 81a (when viewed in cross-section) at the region where each engagement roller 83 shifts to the lock cancellation recess 77 and a length of each engagement roller 83. Here, let's assume that the length of each engagement roller 83 is constant, and then the smaller the thickness of the clutch outer ring portion 81a (when viewed in cross-section) at the region where each engagement roller 83 shifts to the lock cancellation recess 77 becomes, the more the precision of the torque limiter-operating torque is enhanced. Particularly, the outer peripheral surface of the clutch inner ring portion 72a forms the cam surfaces 76, and the inner peripheral surface of the clutch outer ring portion 81a is a circumferential surface of a round cross-section, and therefore it is easier to control the thickness of the clutch outer ring portion 81a, and the precision of the torque limiter-operating torque can be more easily enhanced. However, the thickness of the clutch outer ring portion 81*a* need to be made smaller than the thickness of the clutch inner ring portion 72*a* on condition that the clutch outer ring portion 81*a* has a necessary minimum strength for the torque limiter-operating torque.

The support bearing 9 comprises the bearing outer ring portion 81*b* of the one-piece outer ring 81, the bearing inner ring portion 72*b* of the one-piece inner ring 72, a plurality of balls (rolling elements) 91 disposed between the outer and inner ring portions 81*b* and 72*b* and held by a crown type cage 92.

The torque limiter-incorporating one-way clutch 8 requires the support bearing 9 for positioning (centering or aligning) the clutch inner ring portion 72*a* and the clutch outer ring portion 81*a*. Without the support bearing 9, a wedge angle of the one-way clutch 8 is changed, so that the torque limiter-operating torque in the torque limiter function of the one-way clutch 8 is varied. However, the one-way clutch 8 is influenced by the rigidity of the support bearing 9, and therefore a low-rigidity portion (reduced-thickness portion) 81*c* is provided at the boundary between the clutch outer ring portion 81*a* of the one-way clutch 8 and the bearing outer ring portion 81*b* of the support bearing 9 so that the influence of the rigidity of the support bearing 9 will not be exerted on the one-way clutch 8 as much as possible. The low-rigidity portion 81*c* may be in any other suitable form such as a notch portion, a groove, a continuous hole, a low-rigidity welded portion, etc., which can induce bending deformation in a radially outward direction. Furthermore, the low-rigidity portion 81*c* may be formed at the one-piece inner ring 72 at the boundary between the one-way clutch 8 and the support bearing 9.

At the region where each engagement roller 83 shifts to the lock cancellation recess 77, the thickness of the clutch outer ring portion 81*a* of the one-way clutch 8 is smaller than the thickness of the bearing outer ring portion 81*b* of the support bearing 9 when viewed in cross-section. The bearing outer ring portion 81*b* is relatively thick, and therefore the support bearing 9 has a sufficient rigidity to position (align) the bearing inner ring portion 72*b* and the bearing outer ring portion 81*b*. On the other hand, the clutch outer ring portion 81*a* is relatively thin, and therefore the thickness of the clutch outer ring portion 81*a* can be easily controlled, and the precision of the torque limiter-operating torque in the torque limiter function can be enhanced.

The one-way clutch 8 and the support bearing 9 are lubricated by the same grease sealed between the one-piece outer ring 81 and the one-piece inner ring 72, and seal members 11 and 12 are disposed between the one-piece outer ring 81 and the one-piece inner ring 72 at axial opposite end portions of the unit, and seal the grease. The seal member 11 includes a base portion having a metal core, and is fixed at the base portion to an annular step portion formed at one axial end portion of the inner periphery of the one-piece outer ring 81, and a lip portion of the seal member 11 is held in sliding contact with a step portion formed at one axial end portion of the outer peripheral surface of the one-piece inner ring 72. On the other hand, the seal member 12 includes a base portion having a metal core, and is fixed at the base portion to an annular step portion formed at the other axial end portion of the inner periphery of the one-piece outer ring 81, and a lip portion of the seal member 12 is held in sliding contact with a step portion formed at the other axial end portion of the outer peripheral surface of the one-piece inner ring 72.

Next, the operation of the one-way clutch unit 100 of the fifth embodiment having the above construction, as well as the operation of the pulley unit 2, will be described.

In the pulley unit 2, the pulley 5 is driven to be rotated by the belt 3, and power is transmitted from the pulley 5 to the rotation shaft 4 of the compressor 1 via the one-way clutch 8 and the annular plate 10.

Here, when the speed of rotation of the pulley 5 becomes higher than that of the rotation shaft 4 of the compressor 1, each engagement roller 83 of the one-way clutch 8 rolls into the narrower portion of the wedge-like space, thereby achieving the locked state, and as a result the pulley 5, the annular plate 10 and the rotation shaft 4 of the compressor 1 rotate in unison, that is, in synchronism.

On the other hand, when the speed of rotation of the pulley 5 becomes lower than that of the rotation shaft 4 of the compressor 1, each engagement roller 83 of the one-way clutch 8 rolls into the wider portion of the wedge-like space, thereby achieving the free state, and as a result the transmission of rotating power from the pulley 5 to the rotation shaft 4 of the compressor 1 is interrupted, so that the rotation shaft 4 continues to rotate only with a rotation inertia force. As a result, a variation in the rotation transmitted from the crank shaft (not shown) to the pulley 5 is absorbed, and the rotation of the rotation shaft 4 is kept generally constant.

When the rotation shaft 4 and the annular plate 10 are locked, for example, as a result of a failure of the compressor 1 due to seizure, so that the loading torque reaches the predetermined value (for example, 60 Nm), each engagement roller 83 rolls beyond the locking position into a still narrower portion of the wedge-like space, and is fitted into the lock cancellation recess 77 in the cam surface 76. As a result, each engagement roller 83 is disposed in a non-contact condition or idles relative to the pulley 5, and therefore only the pulley 5 rotates, thus performing the torque limiter function of interrupting the transmission of power from the pulley 5 to the rotation shaft 4 of the compressor 1. Thus, even when an overload is applied, the pulley 5 continues to rotate, and therefore the belt 3 will not slip on the pulley 5, which contributes to a prolonged life of the belt 3, and besides adverse effects will not be exerted on the compressor 1 and other engine auxiliary equipments connected via the belt 4, thus achieving the fail-safe function.

However, once each engagement roller 83 is fitted into the lock cancellation recess 77, the engagement roller 83 can not be disengaged from the lock cancellation recess 77, and hence can not be returned to the locking position. Namely, once this condition is encountered, the one-way clutch 8 must be disassembled, and then the engagement rollers 83 are returned to their respective original positions. Alternatively, the one-way clutch unit 100 itself must be replaced with a new one.

In the fifth embodiment, at the region where each engagement roller 83 shifts to the lock cancellation recess 77, the thickness of the clutch outer ring portion 81*a* is smaller than the thickness of the clutch inner ring portion 72*a* when viewed in cross-section. Therefore, when each engagement roller 83 is to be fitted into the lock cancellation recess 77, the clutch outer ring portion 81*a* is mainly elastically deformed, and by controlling the thickness of the clutch outer ring portion 81*a*, the precision of the torque limiter-operating torque can be enhanced. Therefore, the torque limiter function can be performed just when this is desired, and damage to the engine auxiliary equipment due to an excessive torque can be prevented.

Furthermore, in the fifth embodiment, the low-rigidity portion is formed at the one-piece outer ring 81 at the boundary between the support bearing 9 and the one-way clutch 8, and therefore adverse effects of the rigidity of the support bearing 9 on the one-way clutch 8 can be prevented.

Furthermore, in the fifth embodiment, the thickness of the clutch outer ring portion 81a of the one-way clutch 8 is smaller than the thickness of the bearing outer ring portion 81b of the support bearing 9, and therefore the support bearing 9 has a sufficient rigidity to position (align) the one-piece inner ring 72 and the one-piece outer ring 81, while the precision of the torque limiter-operating torque can be enhanced according to the thickness of the clutch outer ring portion 81a of the one-way clutch 8.

Although the fifth embodiment of the invention has been described above, this embodiment is merely one example of the invention, and the invention is not limited to this embodiment, and various modifications can be made without departing from the subject matter of the appended claims.

For example, in the fifth embodiment, although the cam surfaces 76 are formed on the clutch inner ring portion 72a, cam surfaces may be formed on the clutch outer ring portion 81a.

Furthermore, in the fifth embodiment, although the support bearing 9 is provided at one side of the one-way clutch 8, two support bearings 9 may be provided respectively at the opposite sides of the one-way clutch 8.

What is claimed is:

1. A torque limiter-incorporating one-way clutch comprising:
    an outer ring;
    an inner ring;
    a roller disposed between the outer and inner rings;
    a cage that includes an urging member urging the roller in a biting direction and a pocket receiving the roller;
    a cam surface that defines a locking position and a free position and is formed on the inner ring; and
    a recess formed in a region which is disposed beyond the locking position of the cam surface so that, if an overload is applied, then the roller is fitted into the recess,
    wherein a length of the pocket in a circumferential direction is smaller than a sum of an outer diameter of the roller and a free length of the urging member, and
    wherein an inner peripheral surface of the cage is formed so as to have a diameter substantially equal to a maximum diameter of the cam surface except in a vicinity of a spring receiving surface at which a rotation prevention portion is formed radially inwardly of a radially innermost portion of a spring retaining portion.

2. The torque limiter-incorporating one-way clutch according to claim 1, wherein the cage can rotate relative to the one of the outer and inner rings which includes the recess.

3. The torque limiter-incorporating one-way clutch according to claim 1, wherein the one of the outer and inner rings which includes the cam surface comprises a polygonal transverse cross-section.

4. The torque limiter-incorporating one-way clutch according to claim 1, wherein, if the roller is disposed beyond the locking position, towards the recess, then the roller is brought into abutting engagement with a roller receiving surface of the cage.

5. The torque limiter-incorporating one-way clutch according to claim 1, wherein the cage can rotate relative to both the outer and inner rings when the cage is in other than an overload-applied condition.

6. The torque limiter-incorporating one-way clutch according to claim 1, wherein the recess is disposed on an opposite side of the locking position in relation to the free position.

7. The torque limiter-incorporating one-way clutch according to claim 1, wherein if the cage is in an overload-applied condition, then the cage can not rotate in a direction of a reaction force of the urging member and can rotate in a direction opposite the reaction force of the urging member.

* * * * *